US008498011B2

(12) United States Patent
Takahashi

(10) Patent No.: US 8,498,011 B2
(45) Date of Patent: Jul. 30, 2013

(54) IMAGE FORMING APPARATUS AND CONTROL METHOD FOR DYNAMICALLY ADJUSTING RENDERING SPEED AND PRINTING SPEED

(75) Inventor: Katsuyuki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 12/056,641

(22) Filed: Mar. 27, 2008

(65) Prior Publication Data

US 2008/0239380 A1 Oct. 2, 2008

(30) Foreign Application Priority Data

Mar. 27, 2007 (JP) ................................ 2007-082747

(51) Int. Cl.
*G06K 15/00* (2006.01)
*G06F 3/12* (2006.01)
*H04N 1/00* (2006.01)

(52) U.S. Cl.
USPC ..................... 358/1.16; 358/1.15; 358/426.06

(58) Field of Classification Search
None
See application file for complete search history.

(56) References Cited

U.S. PATENT DOCUMENTS

2005/0201771 A1* 9/2005 Mizuno ........................... 399/88
2006/0028694 A1* 2/2006 Soda ........................ 358/426.06
2006/0055970 A1* 3/2006 Smith et al. ................. 358/1.16

FOREIGN PATENT DOCUMENTS

JP 2003-094773 4/2003
JP 2003-345567 12/2003

OTHER PUBLICATIONS

JP-2005111693—abstract.*
JP-02202169—abstract.*
JP-02202169—translation.*

* cited by examiner

*Primary Examiner* — Fan Zhang
(74) *Attorney, Agent, or Firm* — Cowan, Liebowitz & Latman, P.C.

(57) ABSTRACT

An image forming apparatus and a control method thereof configured to input PDL data and render the PDL data into image data to form an image, wherein a rendering speed in rendering the PDL data into the image data and an image forming speed are changeable, and by changing the rendering speed and the image forming speed within a predetermined power consumption, suppresses degradation in image forming speed. When an amount of rendered and stored image data yet to be used for image forming equals or exceeds a first threshold, the speed of an image data rendering process is reduced while image forming speed is increased. Conversely, when the amount of rendered and stored image data yet to be used for image forming equals or falls below a second threshold, the speed of an image data rendering process is increased while image forming speed is reduced.

10 Claims, 21 Drawing Sheets

IMAGE FORMING APPARATUS AND CONTROL METHOD FOR DYNAMICALLY ADJUSTING RENDERING SPEED AND PRINTING SPEED

BACKGROUND OF THE INVENTION

1. Field of the Invention

The present invention relates to an image forming apparatus and a control method thereof configured to convert print data into raster image data to form an image.

2. Description of the Related Art

In recent years, creating document data using a PC (personal computer) has become common practice. Accordingly, many printing apparatuses such as copiers, facsimiles, printers and the like are now provided with a PDL printing function that interprets PDL data generated by an application executed on a PC and renders print data such as PDL data into raster image data to be printed. Such a PDL data (print data) rendering process is primarily performed by software executed by a CPU (central processing unit) of the printing apparatus. In addition, there is a demand for increasing the rendering speed of such PDL data in order to further improve the printing speed of the printing apparatus.

A conceivable method of increasing the processing speed of a CPU is to increase the clock frequency of a CPU clock that drives the CPU. However, an increase of clock frequency results in an increase of electric power consumption of the CPU and the higher the printing speed of a printing apparatus, the greater the electric power consumption. Consequently, there is a problem in that an increase of the clock frequency of a CPU in combination with the high-speed performance of a printing apparatus further increases total electric power consumption.

Meanwhile, in mobile devices such as a notebook PC or the like, reducing electric power consumption by dynamically changing the clock frequency of a CPU has become common practice. Similarly, with printing systems, techniques for dynamically changing the clock frequency of a CPU that executes a PDL data rendering process are described in Japanese Patent Laid-Open No. 2003-345567 and Japanese Patent Laid-Open No. 2003-94773.

According to a multifunction system described in Japanese Patent Laid-Open No. 2003-345567, a processing load of a PDL data rendering process is predicted according to the amount of PDL data or the type of application that generated the PDL data. Furthermore, in a case that the load of a PDL data rendering process is predicted to be large, the processing capability for PDL data rendering is increased by increasing the clock frequency of the CPU. Japanese Patent Laid-Open No. 2003-345567 also describes that an increase in overall electric power consumption is suppressed by prohibiting concurrent activation of other jobs upon increasing the clock frequency of the CPU.

According to a print system described in Japanese Patent Laid-Open No. 2003-94773, a time period required to print PDL data is measured and recorded per processing unit (1 page or 1 band), whereby processing speed is increased by increasing the clock frequency of CPU when the required time period is lengthened.

The technique described in Japanese Patent Laid-Open No. 2003-345567 requires that a load of a PDL data rendering process be predicted in advance. However, it is difficult to accurately predict the load of a PDL data rendering process from the data amount of the PDL data or the application that generated the PDL data. Therefore, in the event of a prediction failure, a situation occurs where PDL data with a large load is processed by a CPU driven by a CPU clock with a low frequency, resulting in a significant increase in processing time. In addition, when restricting concurrent operations by the printing apparatus in order to suppress increases in total electric power consumption, there is a problem of operability degradation.

Furthermore, with the technique disclosed in Japanese Patent Laid-Open No. 2003-94773, a processing time period of a performed printing process of PDL data is measured per processing unit, and a clock frequency of the CPU for processing a next processing unit is determined based on the measured processing time period. Therefore, when the load changes drastically from one processing unit to the next, there is a risk that processing performance will actually decline. Moreover, an increase in electric power consumption due to an increase in the clock frequency of a CPU is not considered. However, since power consumption is restricted in a real-world apparatus, in all actuality, the clock frequency cannot be increased beyond a certain level.

SUMMARY OF THE INVENTION

An object of the present invention is to eliminate the above-mentioned problems encountered in conventional art.

According to an aspect of the present invention, it is to realize an image forming process that achieves a balance between a PDL data rendering process and the image forming process while limiting electric power consumption of an entire apparatus to or below a certain value.

According to an aspect of the present invention, there is provided an image forming apparatus comprising:

a rendering unit configured to render print data into image data;

a storage unit configured to store the image data rendered by the rendering unit;

an image forming unit configured to form an image based on the image data;

a setting unit configured to set a processing speed of the rendering unit and an image forming speed of the image forming unit; and a control unit configured to perform control so as to reduce the processing speed from a second processing speed to a first processing speed and increase the image forming speed from a first image forming speed to a second image forming speed in response to that the amount of image data, stored in the storage unit and unused for image forming, becomes or more than a first threshold.

According to an aspect of the present invention, there is provided a control method of an image forming apparatus for rendering input print data to perform image forming, the method comprising:

a rendering step for rendering the print data into image data;

a storage step for storing the image data rendered in the rendering step into a memory;

an image forming step for forming an image based on the image data;

a setting step for setting a processing speed in the rendering step and an image forming speed in the image forming step; and a control step for performing control so as to reduce the processing speed from a second processing speed to a first processing speed and increase the image forming speed from a first image forming speed to a second image forming speed in response to that the amount of image data, stored in the memory and unused for image forming, becomes more than a first threshold.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Numerous embodiments of the present invention will now herein be described below in detail with reference to the accompanying drawings. The following embodiments are not intended to limit the claims of the present invention.

While a multifunction peripheral (MFP) will be described as an example of an image forming apparatus for the exemplary embodiment, an image forming apparatus according to the present invention is not limited to this example and a general-purpose printer, copier, facsimile apparatus or the like may be used instead.

Figure 1:
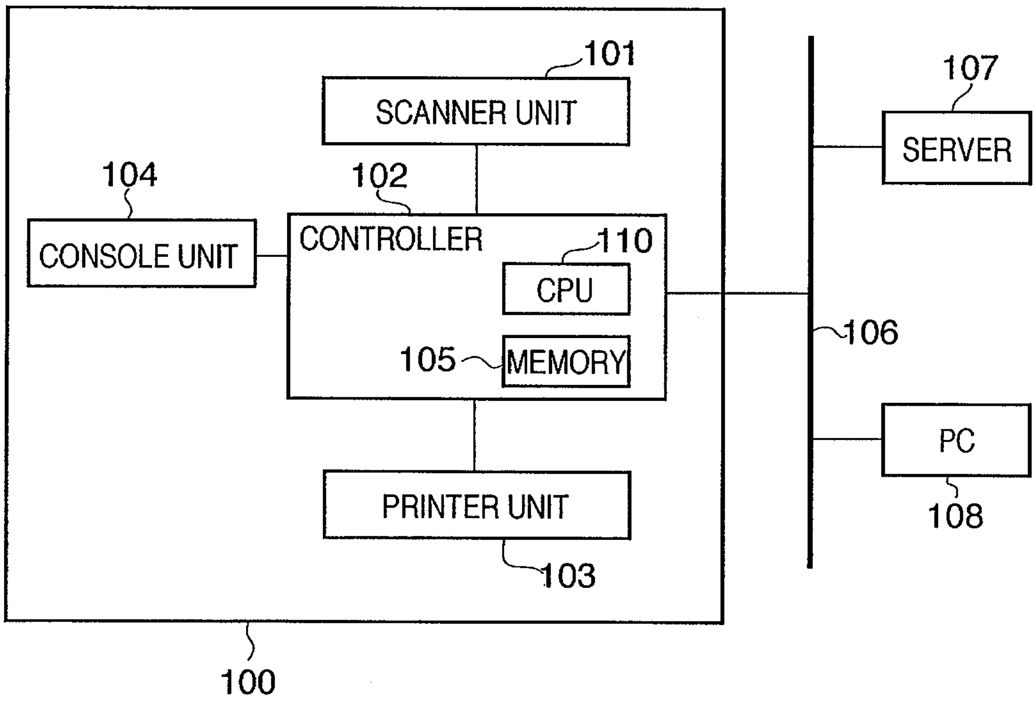
FIG. 1 is a configuration diagram of a printing system including a multifunction peripheral (MFP) according to an exemplary embodiment of the present invention.

FIG. 1 is a configuration diagram of a printing system including a multifunction peripheral according to the present exemplary embodiment.

A multifunction peripheral 100 primarily comprises a scanner unit 101, a controller 102, a printer unit 103 and a console unit 104. The scanner unit 101 reads an original and inputs the same as image data. The controller 102 performs image processing on the image data input from the scanner unit 101 and stores the same in a memory (storage unit) 105, and performs control such as outputting the image data to the printer unit 103 for printing or transmitting the image data to another device via a network 106. The controller 102 includes a CPU 110. A detailed description of the CPU 110 will be given later. The console unit 104 is used by a user to set a printing condition of image data input from the scanner unit 101 and to set a processing request for such image data. The printer unit 103 prints an image visualized on a recording sheet according to the supplied image data. The multifunction peripheral 100 is connected via the network 106 to a server 107 that manages image data, a PC (personal computer) 108 that issues instructions such as a print instruction, and the like. The multifunction peripheral 100 also functions as a copier, a network printer, an image reading apparatus, and a storage for storing image data.

Figure 2:
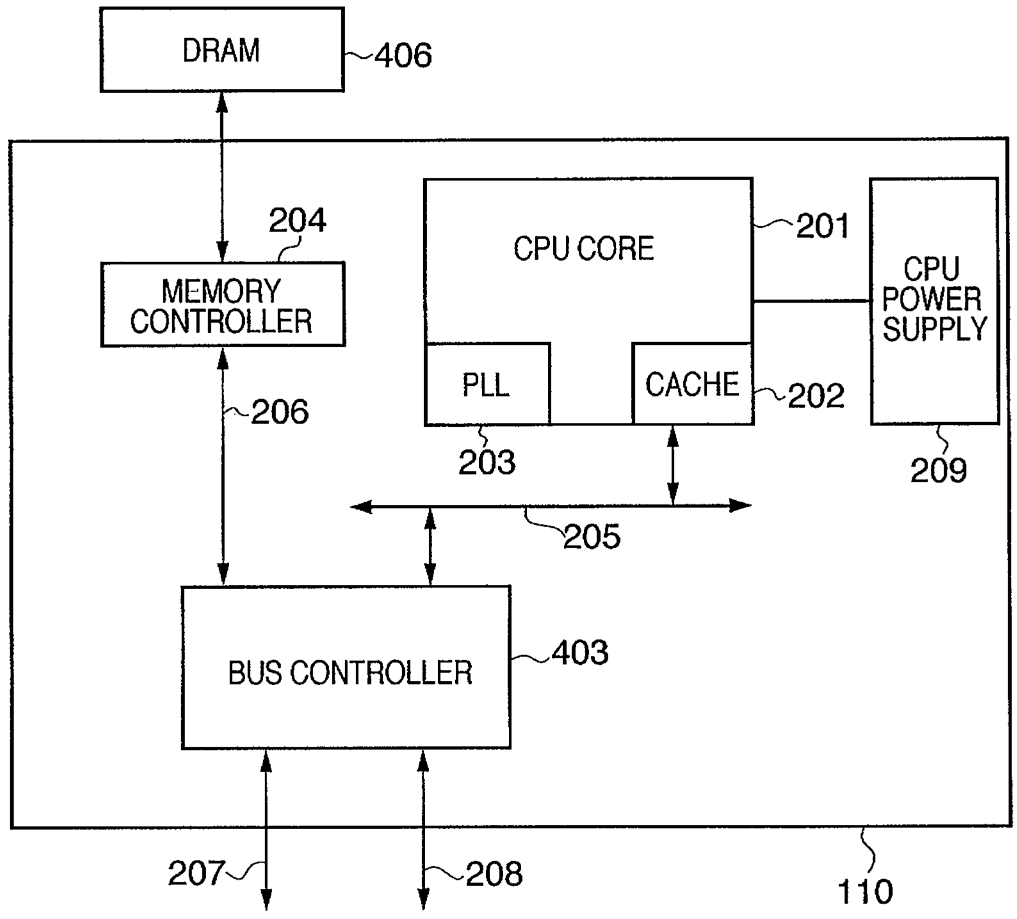
FIG. 2 is a diagram describing a detailed configuration of a CPU of the multifunction peripheral controller according to the present exemplary embodiment.

FIG. 2 is a diagram describing a detailed configuration of the CPU 110 of the controller 102 of the multifunction peripheral according to the present embodiment.

The CPU 110 includes a CPU core 201, a memory controller 204 and a bus controller 403. The CPU core 201 includes a PLL (Phase Locked Loop) unit 203 that multiplies a system clock to generate a high-speed CPU clock signal (drive clock) and a cache 202 (command cache, data cache). The CPU core 201 and the bus controller 403 are connected via a front side bus 205, and the memory controller 204 and the bus controller 403 are connected via a memory bus 206. The memory controller 204 controls read/write of data from/to a DRAM 406. The bus controller 403 is connected to a system bus 207 and an image bus 208, and enables access of an external device from the CPU 110 and read/write of data from/to the DRAM 406 from an external device. A CPU power supply 209 is provided exteriorly to the CPU 110 and reduces voltage supplied from a controller power supply 442 (FIG. 4) to supply the reduced voltage to the CPU core 201. The CPU power supply 209 is capable of supplying a voltage having a plurality of voltage values to the CPU core 201 in accordance with an instruction from the CPU 110.

Figure 3A:
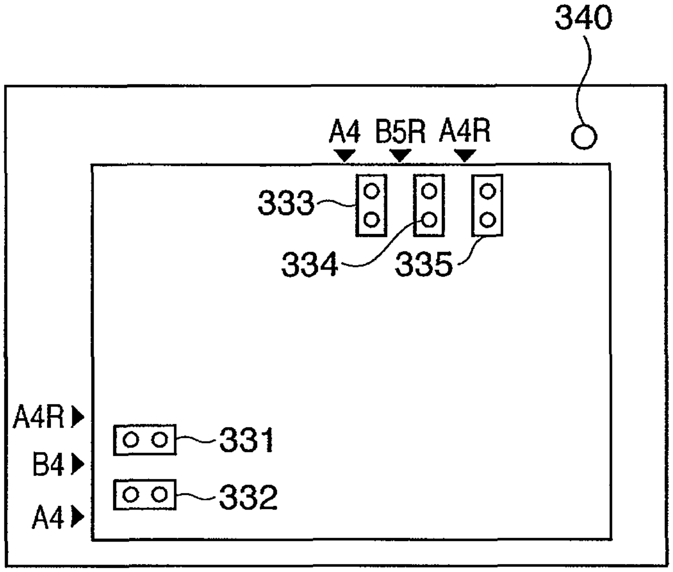
FIGS. 3A to 3C are diagrams explaining an overall configuration of the multifunction peripheral according to the present embodiment.
Figure 3B:
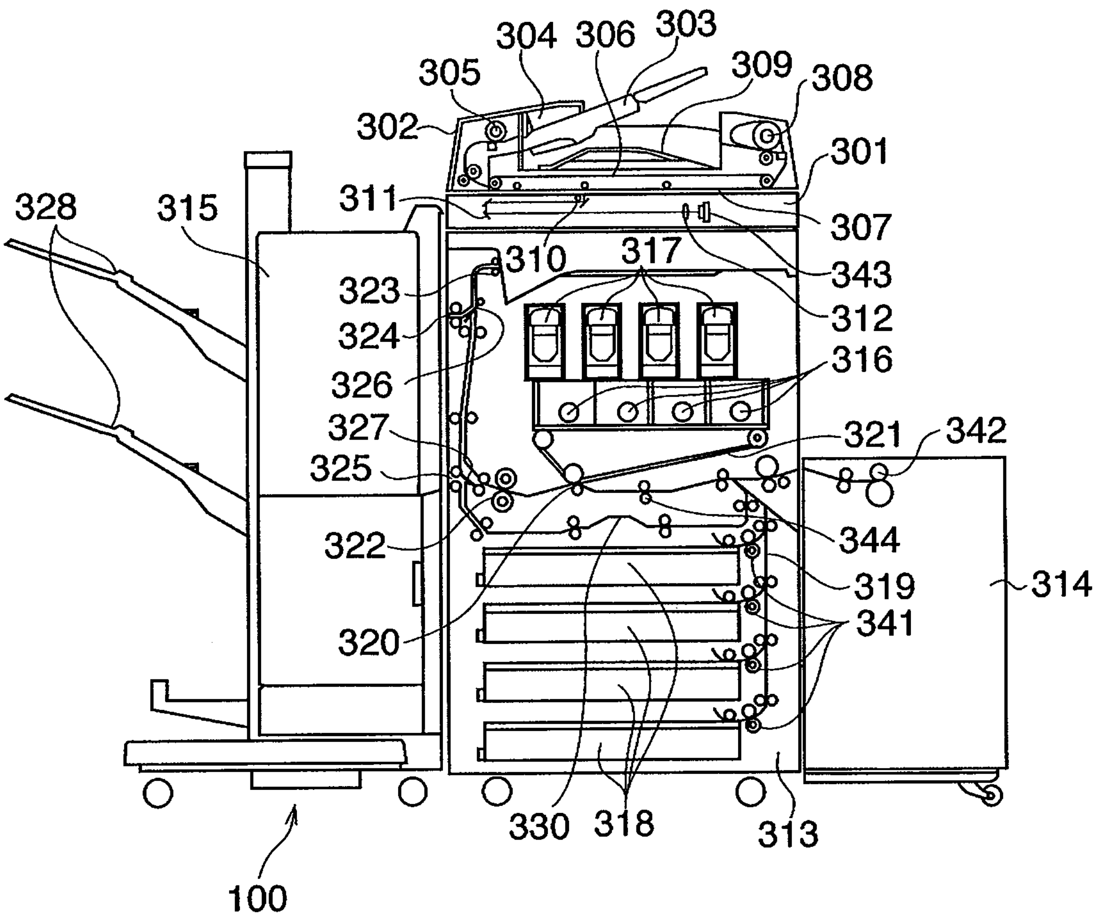
Figure 3C:
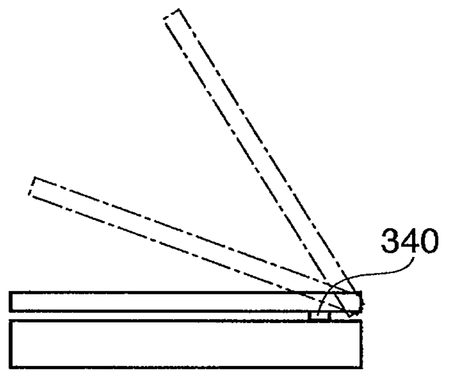

FIGS. 3A to 3C are diagrams describing an overall configuration of the multifunction peripheral according to the present embodiment, wherein FIG. 3A depicts an upper plan view of a platen, FIG. 3B depicts a view of a structural cross section of the multifunction peripheral, and FIG. 3C depicts a lateral view of the platen.

The multifunction peripheral 100 is respectively equipped with copy, print and fax functions. In FIG. 3B, the aforementioned scanner unit 101 includes a scanner 301 and a document feeder (DF) 302, and the printer unit 103 includes a printer engine 313 for printing which is provided with a four-color drum, a feed deck 314 and a finisher 315.

First, the scanner unit 101 will be described. When reading is performed after setting an original on a platen, the original is set on a platen 307 and the DF 302 is closed. An open/close sensor 340 (FIGS. 3A and 3C) detects that the platen has been closed. Reflective original size detection sensors 331 to 335 (FIG. 3A) provided inside the chassis of the scanner 301 detect the size of the original. Based on the detected size, a light source 310 is turned on to irradiate the original, whereby an image of the original is formed on a CCD 343 via reflectors 311 and a lens 312. An image signal converted into a digital signal by the CCD 343 in this manner is subjected to desired image processing and converted into a laser recording signal. Image data obtained in this manner is also stored in the memory 105 of the controller 102, as will be described later with reference to FIG. 4.

In addition, in the case where an original is set on the DF 302 to be read, when placing the original on a tray of an original setting unit 303 of the DF 302 with the image face of the original face up, an original presence sensor 304 detects that the original has been set. Subsequently, an original feed roller 305 is rotationally driven and a conveyor belt 306 moves to convey the original, whereby the original is placed on a predetermined position on the platen 307. The original on the platen is read by the scanner 301 and image data thereof is stored in the memory 105 of the controller 102. When the reading of a single original is completed in this manner, the conveyor belt 306 is once again moved to send the original towards the right-hand side of FIG. 3B, whereby the read original is discharged to a discharge tray 309 via a discharging-side conveyor roller 308. When a plurality of originals are set on the original setting unit 303, an original is conveyed from the platen towards the right-hand side of the diagram and, at the same time, the next original is fed from the left-hand side via the feed roller 305. Reading of originals is continuously performed in this manner.

The printer unit 103 will now be described. A recording medium (recording sheet) constituted by paper or the like is fed from a cassette 318 mounted to a lower portion of the printer engine 313 or from a feed deck 314. When a recording sheet is fed from the cassette 318, the recording sheet is conveyed from a feed roller pair 341 disposed so as to correspond to each cassette to a feeding path 319. In addition, when a recording sheet is fed from the feed deck 314, the recording sheet is conveyed by a feed roller pair 342 of the feed deck 314 to the feeding path 319. When the recording sheet is conveyed to the position of a registration roller pair 344, conveying of the recording sheet is temporarily suspended to attain synchronicity with an intermediate transfer belt 321. In this manner, a recording sheet for printing the next page can be fed from the cassette 318 or the feed deck 314 when a recording sheet in a transfer-wait state exists at the position of the registration roller pair 344. In this case, the next recording sheet may be detained midway along the feeding path 319 until conveying of the recording sheet detained at the position of the registration roller pair 344 is recommenced. In this manner, printing intervals of a plurality of recording sheets to be fed may be reduced to enhance printing efficiency. This is referred to as advance feeding.

An image forming process will now be described. A recording signal (image data for printing) temporarily stored in the memory 105 of the controller 102 is transferred to the printer engine 313 where a laser recording unit converts the recording signal into laser light of four colors: Y (yellow), M (magenta), C (cyan) and black. Each laser light is irradiated to a photosensitive drum 316 respectively corresponding to the laser light and an electrostatic latent image corresponding to each color is formed on each photosensitive drum 316. Each electrostatic latent image is developed by a toner of a corresponding color supplied from a toner cartridge 317 to become a visualized toner image. Toner images in the respective colors are superimposed on the intermediate transfer belt 321 and are subjected to primary transfer. Subsequently, the intermediate transfer belt 321 is rotated at a constant speed in a clockwise direction, and conveying of the recording sheet at the position of the registration roller pair 344 commences once the intermediate transfer belt 321 rotates to a predetermined position. In this case, the predetermined position refers to a position where a leading edge of the recording sheet is conveyed to a secondary transfer position 320 when a leading edge of an image transferred onto the intermediate transfer belt 321 arrives at the secondary transfer position 320. In this manner, the image on the intermediate transfer belt 321 is transferred onto the recording sheet at the secondary transfer position 320.

The recording sheet on which a full-color image is transferred in this manner is sent to a fixing unit 322 where toner is fixed thereon by means of pressure and heat. The recording sheet on which a toner image is fixed is conveyed along a discharging path to be discharged to a face-down center tray 323 or switched back to be discharged to a paper discharge outlet 324 that leads to the finisher or to a face-up side tray 325. The side tray 325 is a paper discharge outlet that becomes capable of discharging paper only when the finisher 315 is not mounted. Flappers 326 and 327 are provided for switching among feeding paths to switch among these paper discharge outlets. In the case of double-sided printing, the flapper 327 switches feeding paths after the recording sheet passes through the fixing unit 322. Subsequently, the recording sheet is switched back to be sent downwards and once again fed to the secondary transfer position 320 via the double-sided feeding path 330 to realize double-sided printing.

Operations performed at the finisher 315 will now be described.

At the finisher 315, post-processing is performed on a printed recording sheet according to a function designated by the user. More specifically, processing such as stapling (1-position or 2-position stapling), hole punching (2-hole or 3-hole), saddle stitching and the like are performed. The multifunction peripheral 100 according to the present embodiment has two paper discharge trays 328. The recording sheet having passed through the paper discharge outlet 324 leading to the finisher 315 is discharged onto either of the paper discharge trays 328 in accordance with a function such as copying, printing and fax designated by a user.

While the printer engine 313 according to the present embodiment is arranged as a printer with a four-color drum, a printer engine with a one-color drum or a printer engine for black and white printing may be used instead. In addition, when the multifunction peripheral 100 is used as a printer, black and white printing/color printing, paper size, 2-up or 4-up printing, N-up printing, double-sided printing can be performed in accordance with the printer driver used. Furthermore, various settings including stapling, hole punching, saddle stitching, inserting paper, cover and back cover are also enabled.

A detailed description will now be given on a hardware configuration of the controller 102 that controls the scanner unit 101, the printer unit 103 and the network interface unit of the multifunction peripheral according to the present embodiment.

Figure 4:
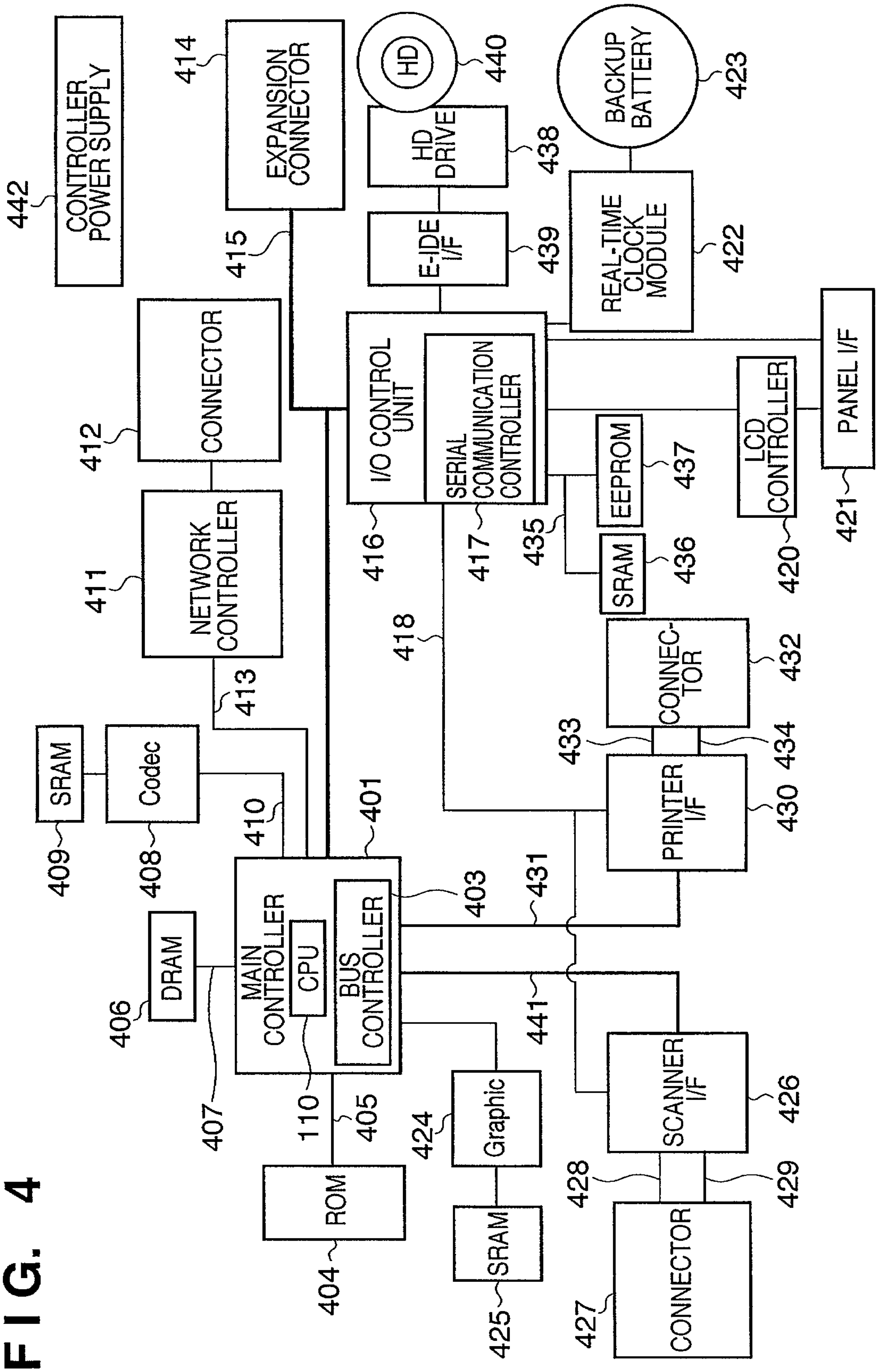
FIG. 4 is a block diagram describing a hardware configuration of a controller of the multifunction peripheral according to the present embodiment.

FIG. 4 is a block diagram describing a hardware configuration of the controller 102 of the multifunction peripheral according to the present embodiment. The controller 102 primarily comprises a main controller 401, the CPU 110, a memory, a bus controller 403 and various interface (I/F) circuits. The memory 105 in FIG. 1 includes the DRAM 406, a ROM 404, SRAMs 409, 425, 436 and an EEPROM 437 in FIG. 4 to be described later, and the like.

The CPU 110 and the bus controller 403 control operations of the entire multifunction peripheral, and the CPU 110 operates based on a program read from the ROM 404 via a ROM I/F 405. An operation for interpreting PDL (page description language) data received from the PC 108 and rendering the PDL data into raster image data is also described in this program. A rendering process of PDL data (print data) is realized by executing this program. The bus controller 403 controls data transfer of data input/output to and from each I/F, and controls arbitration of bus conflicts as well as DMA data transfer. The DRAM 406 is connected to the main controller 401 by a DRAM I/F 407 and provides a work area for the CPU 110 to operate as well as an area for storing image data.

A codec 408 compresses raster image data stored in the DRAM 406 in a format such as MH, MR, MMR, JBIG, JPEG or the like and, conversely, decompresses compressed and stored code data into raster image data. An SRAM 409 is a RAM that is used as a temporary work area by the codec 408. The codec 408 is connected to the main controller 401 via an I/F 410. Data transfer between the codec 408 and the DRAM 406 is controlled by the bus controller 403, and data transfer is performed by DMA. A graphic processor 424 respectively performs processing such as image rotation, image magnification, color space conversion, binarization and the like on raster image data stored in the DRAM 406. An SRAM 425 is used as a temporary work area by the graphic processor 424. The graphic processor 424 is connected to the main controller 401 via an I/F, and data transfer between the graphic processor 424 and the DRAM 406 is controlled by the bus controller 403 and performed as a DMA transfer.

A network controller 411 is connected to the main controller 401 by an I/F 413 and connected to an external network by a connector 412. The Ethernet is generally cited as the external network. An expansion connector 414 for connecting an expansion board and an I/O control unit 416 are connected to a general-purpose high speed bus 415. A PCI bus is generally cited as the general-purpose high speed bus 415. The I/O control unit 416 is provided with two channels of asynchronous serial communication controllers 417 for transmitting and receiving control commands to/from the respective CPUs of the scanner unit 101 and the printer unit 103. The I/O control unit 416 is connected to a scanner I/F circuit 426 and a printer I/F circuit 430 by an I/O bus 418.

A panel I/F 421 is connected to an LCD controller 420 and includes an I/F for performing display on a liquid crystal screen of the console unit 104 and a key input I/F for performing input by means of hard keys and touch panel keys. The console unit 104 includes a liquid crystal display unit, a touch panel input device affixed on the liquid crystal display unit, and a plurality of hard keys. A signal input using the touch panel or the hard keys is sent to the CPU 110 via the aforementioned panel I/F 421 and the liquid crystal display unit displays image data sent from the panel I/F 421. Functions accompanying operations performed on the multifunction peripheral and image data or the like are displayed on the liquid crystal display unit. A detailed description on displaying by the console unit 104 according to the present embodiment will be provided later with reference to FIGS. 6 to 10.

A real-time clock module 422 updates/saves a date and a time managed by the multifunction peripheral and is backed up by a backup battery 423. An E-IDE interface 439 is provided for connecting an external storage device such as a hard disk. In the present embodiment, a hard disk drive 438 is connected via the I/F and operations such as storing image data into a hard disk 440 or reading image data from the hard disk 440 are performed. Connectors 427 and 432 are connected to the scanner unit 101 and printer unit 103 respectively, and are respectively provided with asynchronous serial I/Fs (428, 433) and video I/Fs (429, 434). The scanner I/F 426 is connected to the scanner unit 101 via the connector 427. The scanner I/F 426 is also connected to the main controller 401 by a scanner bus 441. Consequently, it is possible to perform predetermined processing on image data received from the scanner unit 101 and output a control signal generated based on a video control signal sent from the scanner unit 101 to the scanner bus 441. Data transfer from the scanner bus 441 to the DRAM 406 is controlled by the bus controller 403.

The printer I/F 430 is connected to the printer unit 103 via the connector 432 and to the main controller 401 by a printer bus 431. Consequently, image data output from the main controller 401 is subjected to predetermined processing and output to the printer unit 103, and a control signal generated based on a video control signal sent from the printer unit 103 is output to the printer bus 431. Transfer of raster image data rendered into the DRAM 406 to the printer unit 103 is controlled by the bus controller 403. The raster image data is DMA-transferred to the printer unit 103 via the printer bus 431 and the video I/F 434.

Electric power supplied to the SRAM 436 from the backup battery 423 enables the SRAM 436 to retain contents stored therein even when electric power to the multifunction peripheral is cut off. The SRAM 436 is connected to the I/O control unit 416 via a bus 435. The EEPROM 437 is also connected to the I/O control unit 416 via the bus 435.

The console unit 104 for performing various print settings will now be described.

Figure 5:
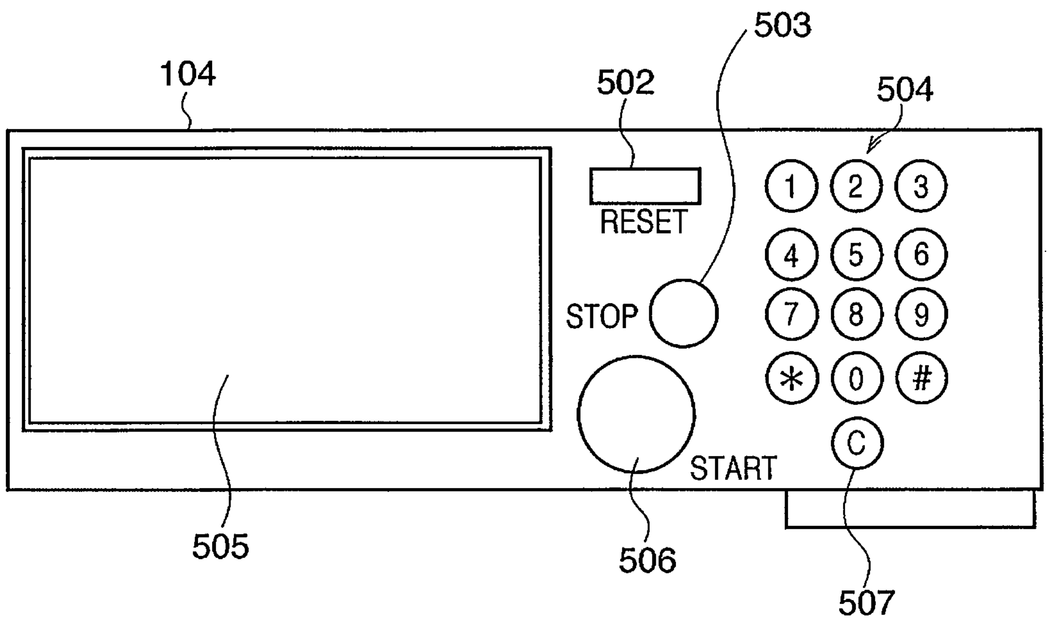
FIG. 5 depicts an upper plan view of a console unit of the multifunction peripheral according to the present embodiment.

FIG. 5 depicts a view of an upper plan view of the console unit 104 of the multifunction peripheral according to the present embodiment. The console unit 104 is connected to the panel I/F 421 in FIG. 4.

Figure 6:
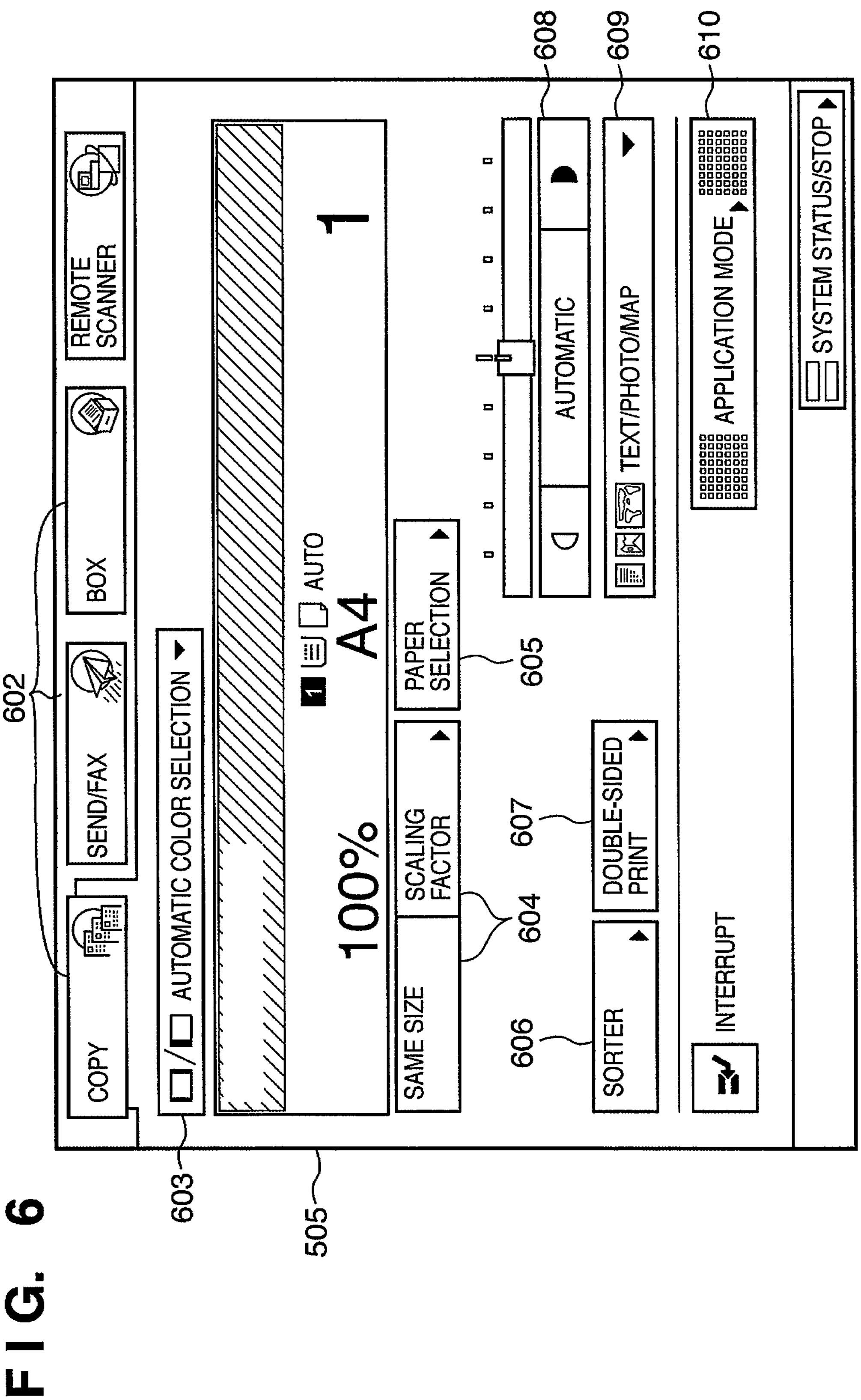
FIG. 6 depicts a view illustrating an example of a UI screen in a case where a copy function is selected.

In the diagram, a key 502 is a reset key for cancelling a setting value or the like set by the user. A key 503 is a stop key used to abort a job in progress. Keys 504 constitute a numerical keypad for inputting numerical values such as numbers. A display unit 505 is the above-mentioned liquid crystal display unit with the touch panel and shows a touch-panel operating screen. More specifically, for example, a screen such as shown in FIG. 6 is displayed. A large number of buttons of the touch panel for performing various settings are displayed on the screen. A key 506 is a start key for designating of the start of jobs such as reading an original. A key 507 is a clear key for clearing various settings and the like.

FIG. 6 depicts a view illustrating an example of a UI screen displayed on the display unit (touch panel) 505 of the console unit 104 of the multifunction peripheral in a case where a copy function is selected.

A tag 602 displayed on an upper portion of the screen is a button for selecting among various functions. Displayed in this case are, from left to right, a copy function, a send function including fax transmission, e-mail transmission and transmission to a file server, a box function and a remote scanner function. The box function is a function that enables image data read by the scanner unit 101 to be stored in the hard disk 440 and also enables operations and printing of data stored therein. The remote scanner function is a function that enables an original to be read by the scanner unit 101 from the PC 108 via the network 106 and image data thereof to be imported into the PC 108. By selecting a tag corresponding to each function, a transition is made to a screen that enables respective detail settings. FIG. 6 is a diagram showing a screen example in the case where the copy function is selected. Displayed in this case are a button 603 for selecting a color mode, a scaling factor button 604, a paper selection button 605, a sorter button 606 for designating finishing such as shift sort or staple sort, and a double-sided print button 607 for designating double-sided printing. Also displayed is a bar 608 for designating density, a button 609 for selecting a type of an original, an application mode button 610 that sets other various application modes, and the like.

The fixing unit 322 of the multifunction peripheral 100 according to the present embodiment will now be described with reference to FIGS. 7 and 8.

Figure 7:
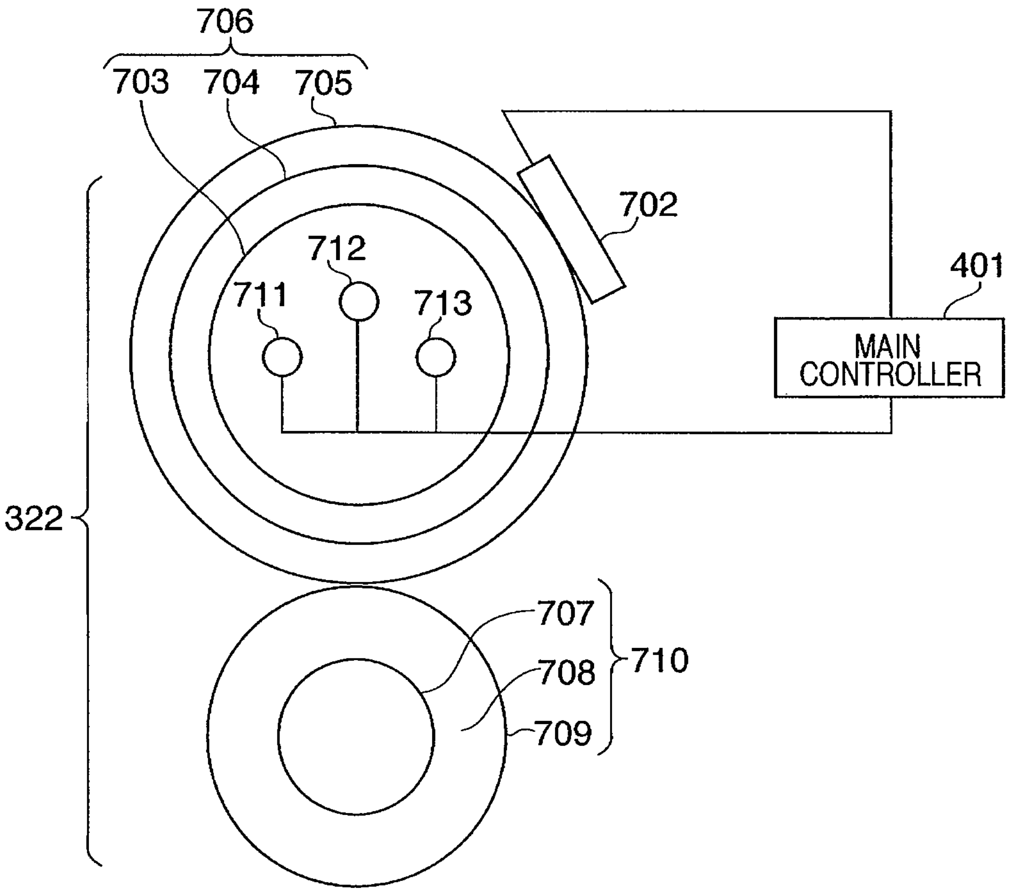
FIG. 7 is a diagram describing a fixing unit of the multifunction peripheral according to the present embodiment.

FIG. 7 is a diagram explaining the fixing unit 322 of the multifunction peripheral according to the present embodiment.

The fixing unit 322 comprises a fixing roller 706 that comes into contact with a toner image on a front face of a recording sheet and a pressure roller 710 that comes into contact with a rear face of the recording sheet. With this fixing unit 322, a recording sheet carrying and supporting an unfixed toner image on a front face thereof is nipped and conveyed by a fixing nip positioned between the fixing roller 706 and the pressure roller 710. At this point, the recording sheet is pressurized and heated to fix the toner thereon. The fixing roller 706 is configured by a metal cored bar 703 provided with a silicon rubber layer 704 thereon as an elastic layer and a PFA coating layer 705 provided on the surface of the silicon rubber layer 704 as a toner mold releasing layer. The PFA coating layer 705 is created by electrostatically painting PFA powder to a desired thickness followed by calcination. On the other hand, the pressure roller 710 is formed by covering a metal solid cored bar 707 with a silicon rubber layer 708 and covering the surface of the silicon rubber layer 708 with a PFA tube layer 709. The fixing roller 706 and the pressure roller 710 are pressurized by a pressurizing mechanism, not shown. During fixing, the fixing roller 706 and the pressure roller 710 rotate together to nip and convey the recording sheet.

The fixing roller 706 is provided with three halogen heaters 711, 712 and 713 disposed inside the hollow cored bar 703 as heating means. A thermistor 702 for detecting the temperature of the fixing roller 706 is placed so as to come into contact with the fixing roller 706. Based on a temperature detected by the thermistor 702, the halogen heaters 711, 712 and 713 are turned on/off by the main controller 401 so that the fixing roller 706 maintains a constant temperature.

The main controller 401 is able to switch between a normal power mode and a power saving mode. Under the normal power mode, temperature control of the fixing roller 706 is performed by turning on all halogen heaters 711, 712 and 713. On the other hand, under the power saving mode, only the halogen heater 712 among the three halogen heaters is turned off and temperature control of the fixing roller 706 is performed using the remaining halogen heaters 711 and 713. Consequently, under the power saving mode, electric power consumed by the fixing unit 322 can be reduced to two thirds of the electric power consumed under the normal power mode.

During fixing of a recording sheet, when the recording sheet passes through the fixing nip between the fixing roller 706 and the pressure roller 710, the recording sheet draws heat from the fixing roller 706 and the pressure roller 710. Therefore, based on the temperature detected by the thermistor 702, the main controller 401 controls energization of the halogen heaters 711, 712 and 713 so as to replenish the heat drawn by the recording sheet to the fixing roller 706. However, under the power saving mode, since the total electric power consumption of the halogen heaters is two thirds as compared to the normal power mode, the amount of heat that can be replenished to the fixing roller 706 within a unit time period is also reduced to approximately two thirds. Therefore, given that the number of recording sheets passing through the fixing unit 322 within a unit time period is the same in the normal power mode and the power saving mode, sufficient heat cannot be replenished to the fixing roller 706 under the power saving mode. As a result, the temperature of the fixing roller 706 drops and a fixing failure occurs. In order to avoid any such circumstance, passage intervals of recording sheets are set longer under the power saving mode as compared to the normal power mode so as to reduce the number of recording sheets that pass in a unit time period. For example, the passage intervals of recording sheets are adjusted to 60 ppm (papers per minute) for A4 cross-feed in the normal power mode and around 40 ppm, which is about two-thirds, under the power saving mode. Accordingly, even in the power saving mode, the temperature of the fixing roller 706 can be maintained constant in the same manner as the normal power mode. The recording sheet passage intervals need not be precisely adjusted to two-thirds. Since required intervals may vary according to the configuration of the fixing unit and the surrounding environment, the recording sheet passage intervals need only be determined in advance within a range in which fixing failures can be avoided.

As described above, with the present embodiment, a plurality of power consumption combinations may be realized by providing three halogen heaters. Moreover, variable control of increasing/decreasing electric power can also be performed by using only a single halogen heater and using control means including constant voltage control and electromagnetically-induced heating.

Figure 8:
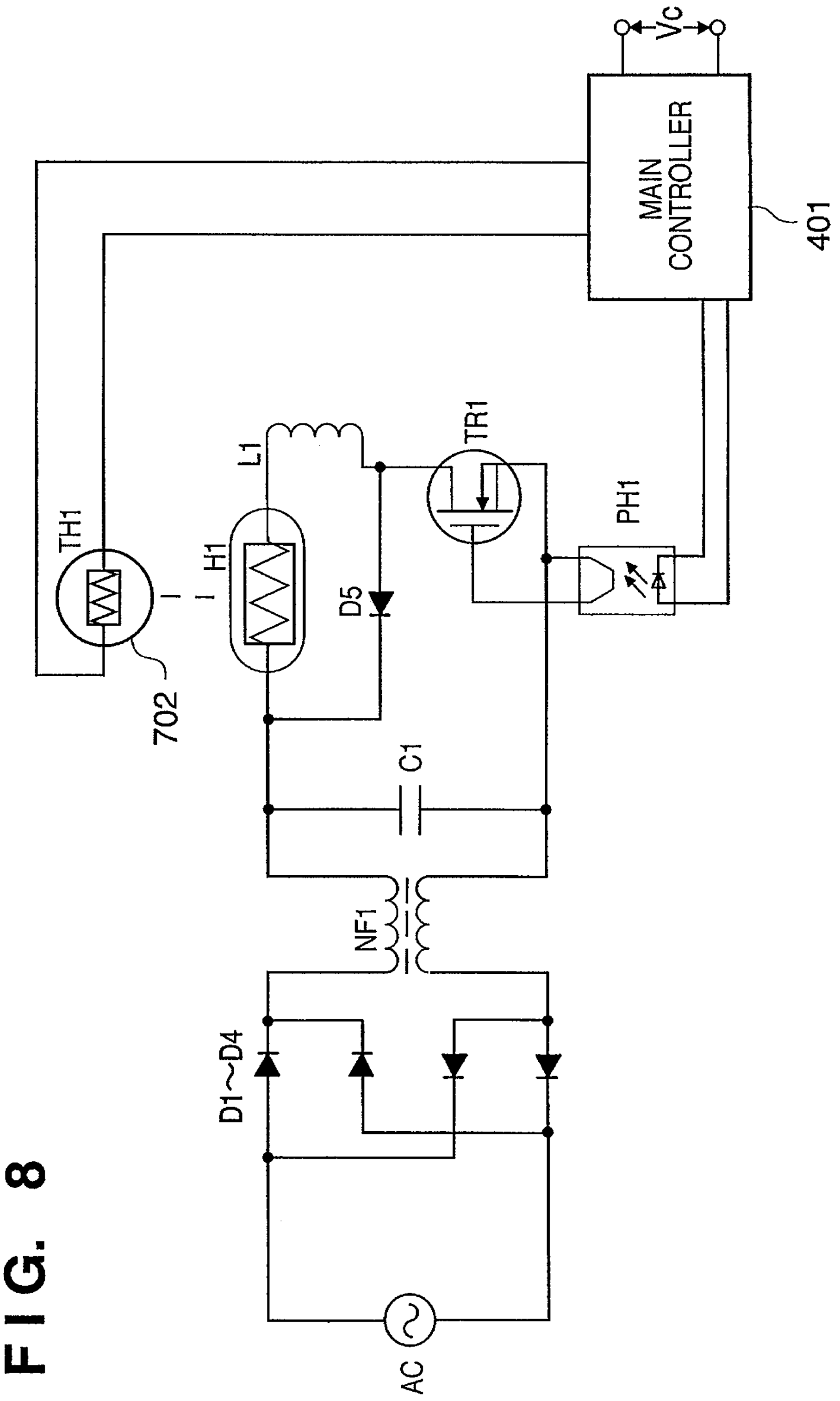
FIG. 8 is a diagram explaining a constant voltage driving circuit that performs temperature control of the fixing unit according to the present embodiment.

FIG. 8 is a control circuit diagram of a case where a constant voltage drive circuit is used for temperature control of the fixing unit 322.

After an alternating current (AC) is rectified and smoothed by diodes D1 to D4 and a condenser C1, a desired voltage can be applied to a heater (H1) when a triac (TR1) is turned on by the main controller 401 to heat the heater. Reference character PH1 denotes a photocoupler that controls activation/deactivation of the triac TR1 according to instructions from the main controller 401. In the case where heaters 711, 712 and 713 are provided as described above, triacs TR1 and photocouplers PH1 will be provided so as to respectively correspond to the heaters (H1).

Figure 9:
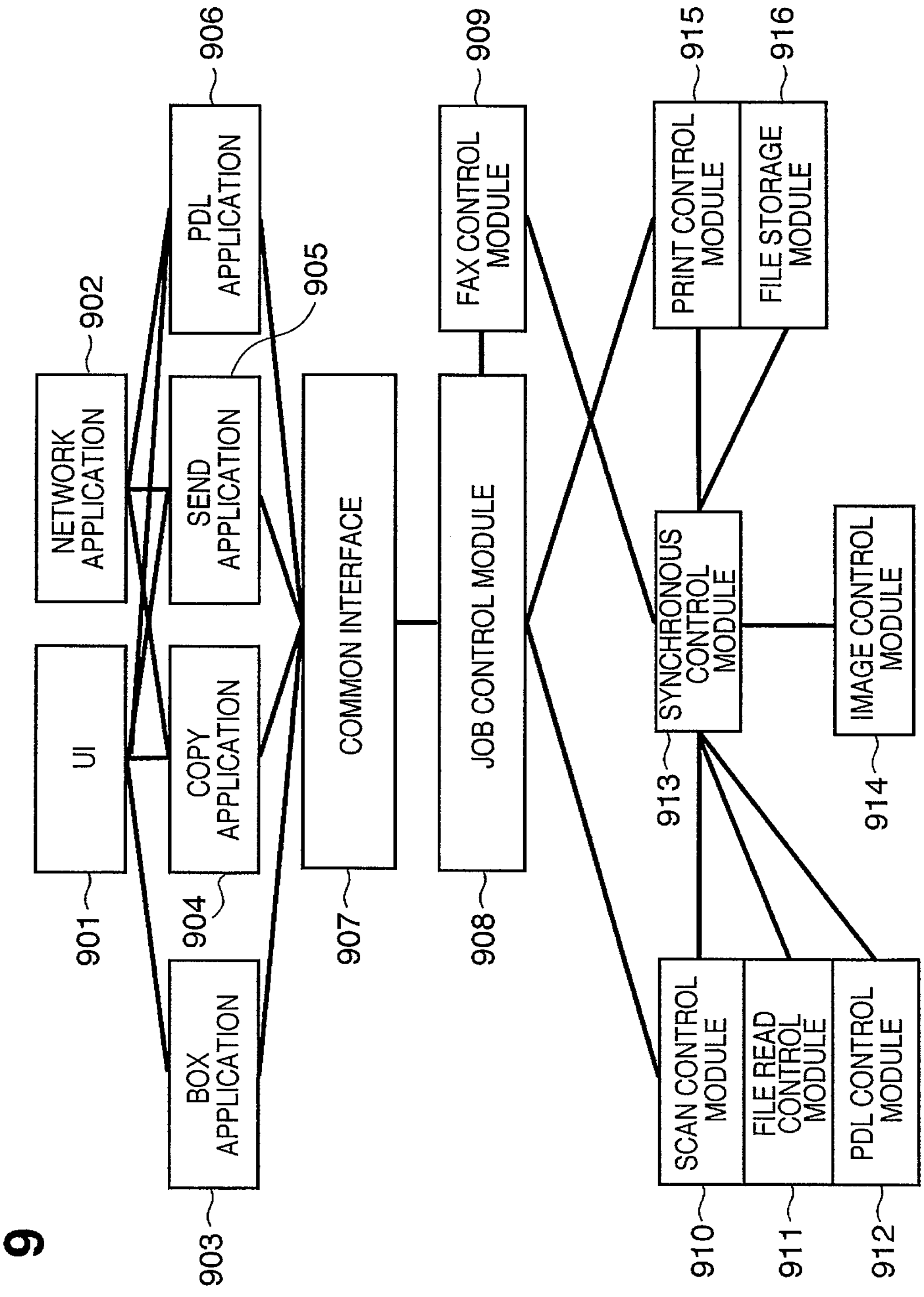
FIG. 9 is a diagram describing a software configuration of the multifunction peripheral according to the present embodiment.

FIG. 9 is a diagram describing a software configuration of the multifunction peripheral 100 provided with the hardware configuration described above.

Reference numeral 901 denotes a UI control module that controls displaying on the console unit 104, input of operational instructions, and the like. According to an instruction from the UI control module 901, a box application 903, a copy application 904, a send application 905 and a PDL application 906 are executed. A network application 902 transmits and receives data via the network 106. The box application 903 controls storage or the like of data received via the network 106 and image data input by the scanner unit 101. The copy application 904 controls copy operations. The send application 905 performs transmitting and receiving operations of data stored in a box or image data input by the scanner unit 101. The PDL application 906 executes a PDL print job upon receiving PDL data from the network application 902. Reference numeral 907 denotes a common interface module for absorbing a device-dependent part of device control portions. A job control module 908 organizes job information received from the common interface module 907 and delivers the information to a lower-level document processing module. The document processing module includes, in the case of a local copy, a scan control module 910 and a print control module 915. In the case of a send job of a remote copy or a send job, the document processing module includes the scan control module 910 and a file storage module 916. In the case of a receive job of a remote copy, the document processing module includes a file read control module 911 and the print control module 915. In the case of printing PDL data such as LIPS or PostScript, a PDL control module 912 and the print control module 915 will be included. Synchronizing between respective document processing modules and requesting image processing to an image control module 914 that performs various image processing are performed via a synchronous control module 913. Image processing during scanning or printing and storing of image files are executed by the image control module 914.

Software control processing of a local copy will now be described.

Copy settings such as the number of copies, a paper size, a scaling factor and the like are transmitted together with a copy instruction to the copy application 904 from the UI control module 901 according to an instruction from the user input by using the UI screen of FIG. 6. The copy application 904 transmits information from the UI control module 901 to the job control module 908 that performs device control via the common interface module 907. The job control module 908 transmits job information to the scan control module 910 and the print control module 915. The scan control module 910 issues a scan request for reading an original to the scanner unit 101 via the scanner I/F 426. At the same time, the scan control module 910 issues a scan image processing request to the image control module 914 via the synchronous control module 913. According to the instruction from the scan control module 910, the image control module 914 performs setting of an image processing unit inside the scanner I/F 426. Once the setting is completed, scan readiness is relayed via the synchronous control module 913. Subsequently, the scan control module 910 issues a scan instruction to the scanner unit 101. The completion of image data transfer of an original scanned in this manner is relayed to the image control module 914 by an interrupt signal from a hardware device, not shown.

Upon receiving a scan completion from the image control module 914, the synchronous control module 913 relays the scan completion to the scan control module 910 and the print control module 915. At the same time, the synchronous control module 913 instructs the image control module 914 to store compressed image data stored in the DRAM 406 into the HDD 440 as a file. According to the instruction, the image control module 914 reads image data (including a character/photograph discrimination signal) from the DRAM 406 and stores the same into the HDD 440. A color judgment/black and white judgment result, a background color removal level for performing background color removal, as well as a scan image and a color space RGB as input sources of the image data are stored in an SRAM, not shown, as information accompanying the image.

When the image data is stored in the HDD 440 in this manner and a scan completion is received from the scanner unit 101, a file storage completion is notified to the scan control module 910 via the synchronous control module 913. Accordingly, the scan control module 910 returns a completion notification to the job control module 908. In turn, the job control module 908 returns a completion notification to the copy application 904 via the common interface module 907. At the point where the image data is stored in the DRAM 406, the print control module 915 issues a print request to the printer unit 103 via the printer I/F 430. At the same time, a print image processing request is made to the synchronous control module 913. The synchronous control module 913 requests setting of image processing to the image control module 914. According to the aforementioned information accompanying the image data, the image control module 914 sets image processing with respect to the printer I/F 430. Print readiness is relayed to the print control module 915 via the synchronous control module 913. Accordingly, the print control module 915 issues a print instruction to the printer unit 103. At this point, the completion of print image data transfer is relayed to the image control module 914 by an interrupt signal from a hardware device, not shown.

Upon receiving a print completion notification from the image control module 914, the synchronous control module 913 relays the print completion to the print control module 915. Upon receiving a paper discharge completion from the printer unit 103, the print control module 915 returns a print completion notification to the job control module 908. In turn, the job control module 908 returns a copy completion to the copy application 904 via the common interface module 907. In this manner, the copy application 904 detects scan and print completion and notifies a job completion to the UI control module 901.

On the other hand, in the case of a remote copy scan job or a send job, the file storage module 916 receives a request from the job control module 908 in place of the print control module 915. A storage completion notification is issued from the file storage module 916 at the point where storing of image data scanned by the scanner unit 101 into the HDD 440 is completed. The completion notification is notified via the job control module 908 and the common interface module 907 to the copy application 904 in the case of a remote copy and to the send application 905 in the case of a send job. The copy application 904 or the send application 905 subsequently requests transmission of a file stored in the HDD 440 to the network application 902. Upon receiving the request, the network application 902 transmits the requested file. The network application 902 also receives copy-related setting information from the copy application 904 upon job commencement, and also notifies the information to a remote-side device. In the case of a remote copy, the network application 902 performs transmission using a communication protocol unique to the device. Furthermore, in the case of a send job, the network application 902 uses a standard file transfer protocol such as FTP and SMB.

When performing fax transmission, after the file is stored, a facsimile transmission instruction is issued from the send application 905 to a FAX control module 909 via the common interface module 907 and the job control module 908. The FAX control module 909 negotiates with the other party's device via a modem (not shown) and requests necessary image processing (color to monochrome conversion, multiple value/binary conversion, rotation, scaling) to the image control module 914. Image data converted in this manner is transmitted using the modem to the other party's device.

When a printer exists at the transmission destination, the send application 905 issues a print instruction as a print job via the common interface module 907. Operations performed at this point are the same as in the case of a remote copy print job which will be described later. In addition, when the transmission destination is a box inside a device, the file is stored in a file system in the device by the file store manager.

Upon fax reception, the FAX control module 909 receives image data from the modem and stores the same as an image file into the HDD 440. After storing the file in the HDD 440 and notifying the box application 903, a print instruction is issued from the box application 903 to the job control module

908 via the common interface module 907. Since subsequent operations are the same as for a box print job, a description thereof will be omitted.

In the case of a remote copy, the network application 902 saves received image data to the HDD 440 and issues a print job to the copy application 904. The copy application 904 supplies a print job to the job control module 908 via the common interface module 907. In this case, unlike a local copy, the file read control module 911 receives a request from the job control module 908 in place of the scan control module 910. In addition, a request to render the received image data from the HDD 440 into the DRAM 406 is issued to the image control module 914 via the synchronous control module 913. Accordingly, the image control module 914 renders the image data into the DRAM 406, and once rendering is completed, rendering completion is relayed to the file read control module 911 and the print control module 915 via the synchronous control module 913. At the point where the image data is stored in the DRAM 406, the print control module 915 issues a print request via the printer I/F 430. At this point, the printer unit 103 is instructed to select a feed stage instructed by the job manager or a feed stage containing a recording sheet whose size is the instructed size. In the case of automatic feeding, a feed stage is determined from the image size and a print request is issued. At the same time, a print image processing request is made to the synchronous control module 913. In response to the request from the print control module 915, the synchronous control module 913 requests the image control module 914 to perform print image processing settings. At this point, if, for example, an optimum-sized recording sheet runs out and image rotation or the like becomes necessary, a rotation instruction is separately requested. When such a rotation instruction is issued, the image control module 914 rotates the image using the graphic processor 424. In this manner, the image control module 914 performs an image processing setting of the printer I/F 430, and relays a print readiness to the print control module 915 via the synchronous control module 913. The print control module 915 issues a print instruction to the printer unit 103.

The completion of print image data transfer is relayed to the image control module 914 by an interrupt signal from a hardware device, not shown. Upon receiving a print completion from the image control module 914, the synchronous control module 913 relays the print completion to the file read control module 911 and the print control module 915. The file read control module 911 returns a print completion notification to the job control module 908. Upon receiving a paper discharge completion from the printer unit 103, the print control module 915 returns a print completion notification to the job control module 908. In turn, the job control module 908 returns a completion notification to the copy application 904 via the common interface module 907. Once scanning and printing are completed, the copy application 904 notifies a job completion to the UI control module 901.

This concludes the summarized description on the hardware and the software of a multifunction peripheral according to the present embodiment. A detailed description will now be given on the control of a PDL print job that is a feature of the present embodiment.

The multifunction peripheral 100 according to the present embodiment is capable of performing printing based on PDL data transmitted from the PC 108 via the network 106. In FIG. 4, the PDL data is temporarily stored by DMA from the network controller 411 to the DRAM 406. Upon receiving a notification from the network controller 411, the network application 902 acknowledges that the received data is stored in the DRAM 406. The received data stored in the DRAM 406 is sequentially stored in the hard disk 440 via the E-IDE I/F 439. At the same time, the network application 902 analyzes the received data, and when the received data is judged to be PDL data, delivers the received PDL data to the PDL application 906. Accordingly, the PDL application 906 reads job information included in the PDL data, and instructs a PDL print job to the job control module 908 via the common interface module 907. The job control module 908 instructs printing of the PDL data to the PDL control module 912 and the print control module 915.

Figure 10:
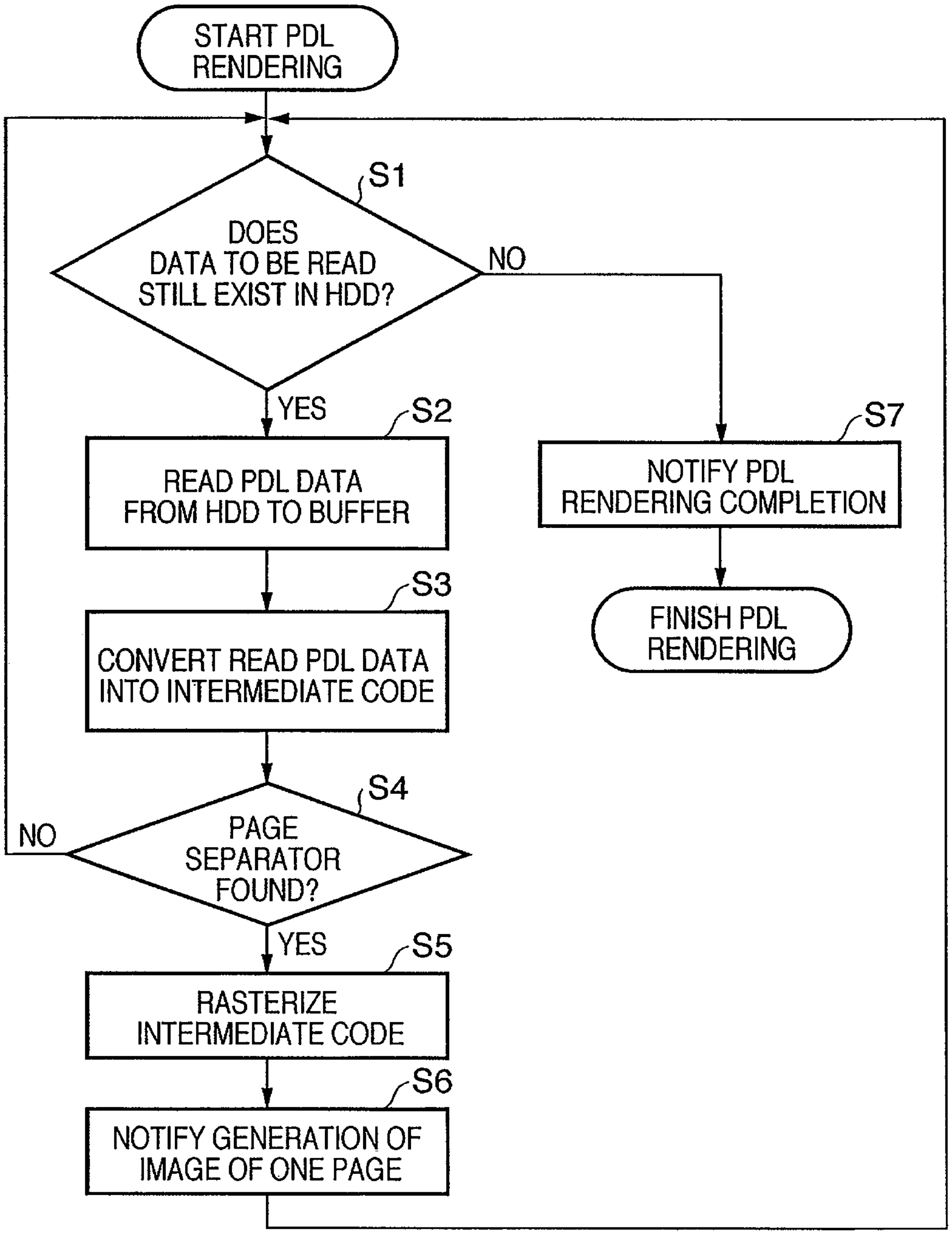
FIG. 10 is a flowchart explaining a PDL data rendering process performed by a PDL control module of the multifunction peripheral according to the present embodiment.

FIG. 10 is a flowchart explaining a PDL data rendering process performed by the PDL control module 912 of the multifunction peripheral 100 according to the present embodiment. A program executing the processing is stored in the memory 105 during execution thereof and is executed under the control of the CPU 110.

The processing is commenced upon input of a PDL data rendering instruction from the job control module 908. First, in step S1, it is determined whether or not read target PDL data (file) is stored in the HDD 440. In a case that PDL data exists, the processing advances to step S2 and writes the PDL data from the HDD 440 to a buffer provided in a predetermined area in the DRAM 406. Next, the processing proceeds to step S3 to analyze the PDL data stored in the buffer and to convert the PDL data into an intermediate code. The intermediate code is data in a format better suited to rasterization than the PDL data and is primarily constituted by edge coordinates, fill data between edges, and the like. The processing next advances to step S4 to determine whether or not a page separator has been found in the processed PDL data. If no page separators are found, the processing of steps S1 to S4 is repeated and conversion of the PDL data to the intermediate code is performed until the page separator is found.

If the page separator is found in step S4, the processing advances to step S5 where rasterization of the intermediate code is performed and a single page's worth of raster image data is stored in the DRAM 406. The processing advances to step S6 to notify that a single page's worth of raster image data has been generated to the synchronous control module 913 and returns to step S1. Accordingly, the synchronous control module 913 attaches a page ID that is unique with respect to the multifunction peripheral 100 to the raster image data and instructs the image control module 914 to store the raster image data. The image control module 914 compresses the raster image data using the codec 408 and stores the compressed image data into the HDD 440. The synchronous control module 913 issues a storage instruction to the image control module 914 and, at the same time, supplies the page ID and instructs printing of the page to the print control module 915. The processing performed by the print control module 915 at this point will be described in detail later.

In this manner, when there are no more read target PDL data in the HDD 440 in step S1, the processing advances to step S7 to notify PDL data rendering completion to the synchronous control module 913 and concludes the PDL data rendering process. At this point, the synchronous control module 913 transmits PDL data rendering completion to the print control module 915.

Among the arithmetic processing performed by the CPU 110, the processes that require the most time are the rendering processes of steps S3 and S5. In other words, the more numerous and complicated the rendering commands are for a single page's worth of PDL data, the more numerous the arithmetic processing required for performing a rendering process on the single page's worth of PDL data and the more time is required. Since the time required to perform a PDL data rendering process is dependent on software processing by the CPU 110, the time required to perform the PDL data rendering process can be reduced by increasing the frequency of a CPU clock that drives the CPU core 201 included in the CPU 110. Accordingly, the multiplying factor of the PLL unit 203 is changed from "1" to "2" or "3". As a result, the clock frequency of the CPU core 201 is doubled or tripled by the PLL unit 203 with respect to a system clock, enabling the per-unit time processing capability of the CPU core 201 to be enhanced by just that much. More specifically, the executing time of an arithmetic command processed by the CPU core 201 can be reduced to ½ or ⅓, if the clock frequency is doubled or tripled. In this manner, the time required to perform a rendering process of a single page's worth of PDL data can be reduced in accordance with the clock frequency.

However, increasing the clock frequency of the CPU core 201 increases electric power consumption of the CPU 110. In addition, when the clock frequency of the CPU core 201 is increased, normal operation of the CPU 110 cannot be realized unless the power supply voltage supplied to the CPU core 201 is increased compared to a case of a lower frequency. As a result, electric power consumption of the CPU 110 further increases. In other words, if the multiplying factor of the PLL unit 203 is raised from "1" to "2" or "3", the voltage generated by the CPU power supply 209 must be increased. Consequently, the electric power consumption of the CPU 110 increases. As seen, reducing the time required for the PDL data rendering process induces an increase in the electric power consumption of the CPU 110.

Figures 11A, 11B, 11C:
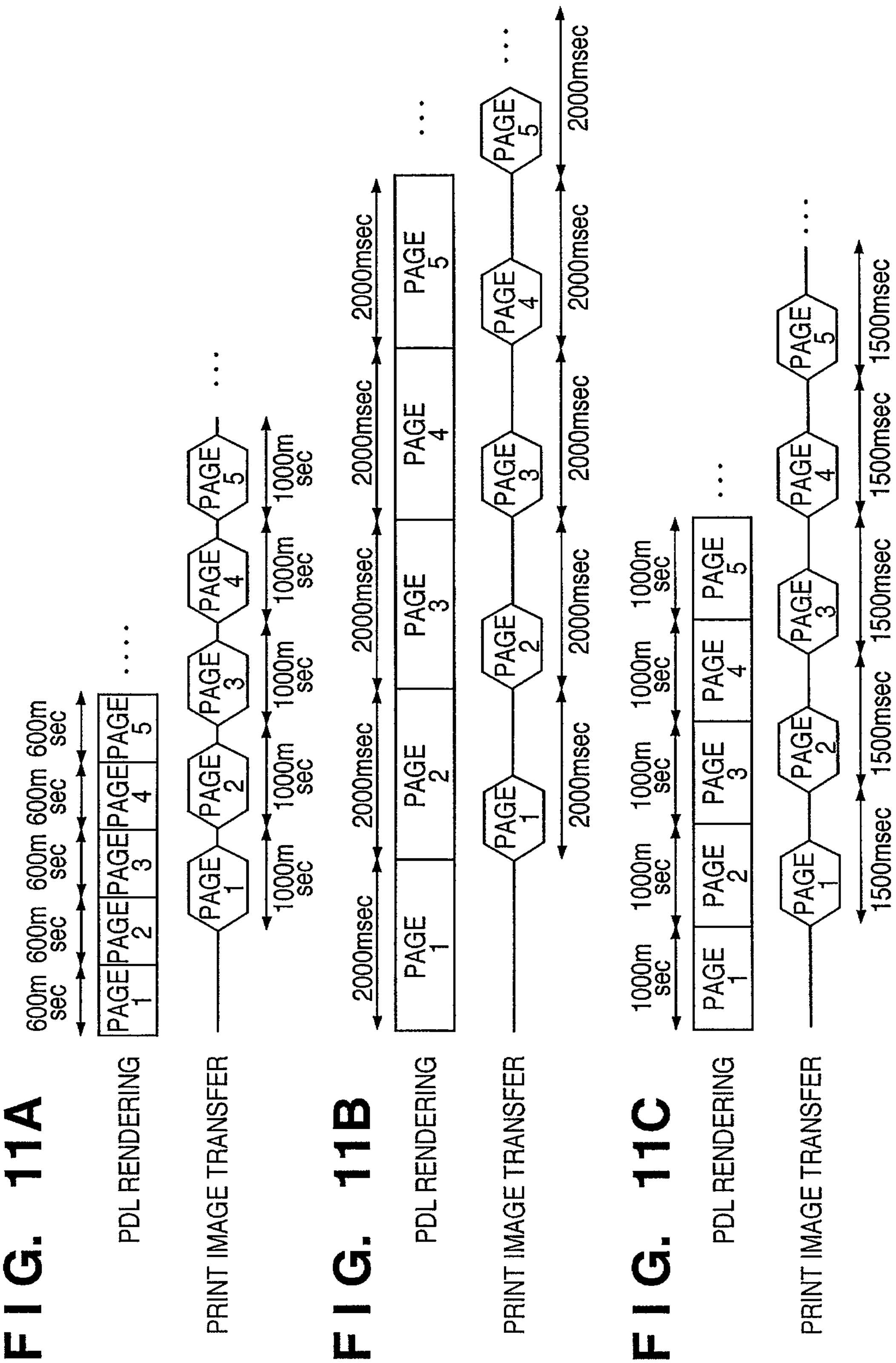
FIGS. 11A to 11C are diagrams schematically showing a relationship between a PDL data rendering process performed by the CPU of the multifunction peripheral and image transfer when printing a page rendered by the CPU using a printing unit.

FIGS. 11A to 11C are diagrams schematically showing a relationship between a PDL data rendering process performed by the CPU 110 of the multifunction peripheral 100 according to the present embodiment and an image data transferring process when printing the rendered page with the printer unit 103. FIGS. 11A to 11C show an example of printing by the printer unit 103 having a maximum printing capability of 60 ppm. In this case, printing capability indicates how many pages' worth of A4-size image data can be printed within a unit time period (e.g., 1 minute). 60 ppm signifies that a maximum of 60 pages can be printed on A4-size recording sheets in one minute.

FIG. 11A shows transfer time periods of image data to be transferred from the controller 102 to the printer unit 103 during printing at the maximum printing capability. For this example, each of the transfer time periods is set to 1000 msec corresponding to the maximum printing speed. In this case, the rendering time period of PDL data of each page is kept under 600 msec. As shown, if the number of rendering commands included in PDL data is small and a PDL data rendering process is completed in, for example, 600 msec, printing may be performed at a maximum printing capability of 60 ppm.

Conversely, in FIG. 11B, since the number of rendering commands included in PDL data is large, a PDL data rendering process takes 2000 msec per page. In this case, the transfer time period of image data from the controller 102 to the printer unit 103 also increases to 2000 msec, resulting in a reduction in printing capability to 30 ppm.

Therefore, in such a case, the PDL data rendering capability is enhanced by increasing the clock frequency of the CPU 110 so that the PDL data rendering process is completed in 1000 msec or less per page as shown in FIG. 11A. As a result, printing can be performed at the maximum printing capability of 60 ppm. However, as described above, increasing the clock frequency of the CPU 110 also increases the electric power consumption of the CPU 110. Therefore, if the maximum electric power consumption of the entire multifunction peripheral is set to, for example, 1500 W, an increase in the clock frequency may result in exceeding the set maximum electric power consumption. As seen, there is a limit to enhancing PDL data rendering capability by increasing the clock frequency of the CPU 110.

In FIG. 11C, the electric power consumed by the printer unit 103 is reduced by setting the printing capability of the printer unit 103 to below the maximum printing capability while the clock frequency of the CPU 110 is raised by just that amount. More specifically, in FIG. 11C, the printing capability of the printer unit 103 is reduced to 40 ppm and the transfer time periods of image data are set to 1500 msec. In FIG. 11C, a case where a rendering process is performed on the same PDL data as in FIG. 11B is assumed, and by increasing the clock frequency of the CPU 110, the rendering time period of PDL data per page is reduced from 2000 msec to 1000 msec. In this manner, by reducing the rendering time period of PDL data per page to 1000 msec, the printing capability of the printer unit 103 can be set to 40 ppm corresponding to the transfer time period of 1500 msec.

As shown in FIG. 11B, while the rendering capability of PDL data acted as a bottleneck to lower the printing capability to 30 ppm, printing can be performed at a printing capability of 40 ppm as shown in FIG. 11C. In a case that the time period required to perform a PDL data rendering process acts as a bottleneck with respect to the printing capability, the printing capability of the printer unit 103 is slightly lowered to reduce electric power consumption while the clock frequency of the CPU is raised by just that much to enhance PDL data rendering capability. In this manner, a quantity by which the printing capability is deteriorated can be reduced while suppressing an increase in the electric power consumption of the entire multifunction peripheral.

However, it is difficult to know precisely how much time period will be required to render PDL data before the PDL data is actually rendered. For this reason, the present embodiment has adopted a system where the electric power consumption of the printer unit 103 and the clock frequency of the CPU 110 are adjusted according to the number of pages of raster image data accumulated in the HDD 440 upon completion of the PDL data rendering process.

Figure 12A:
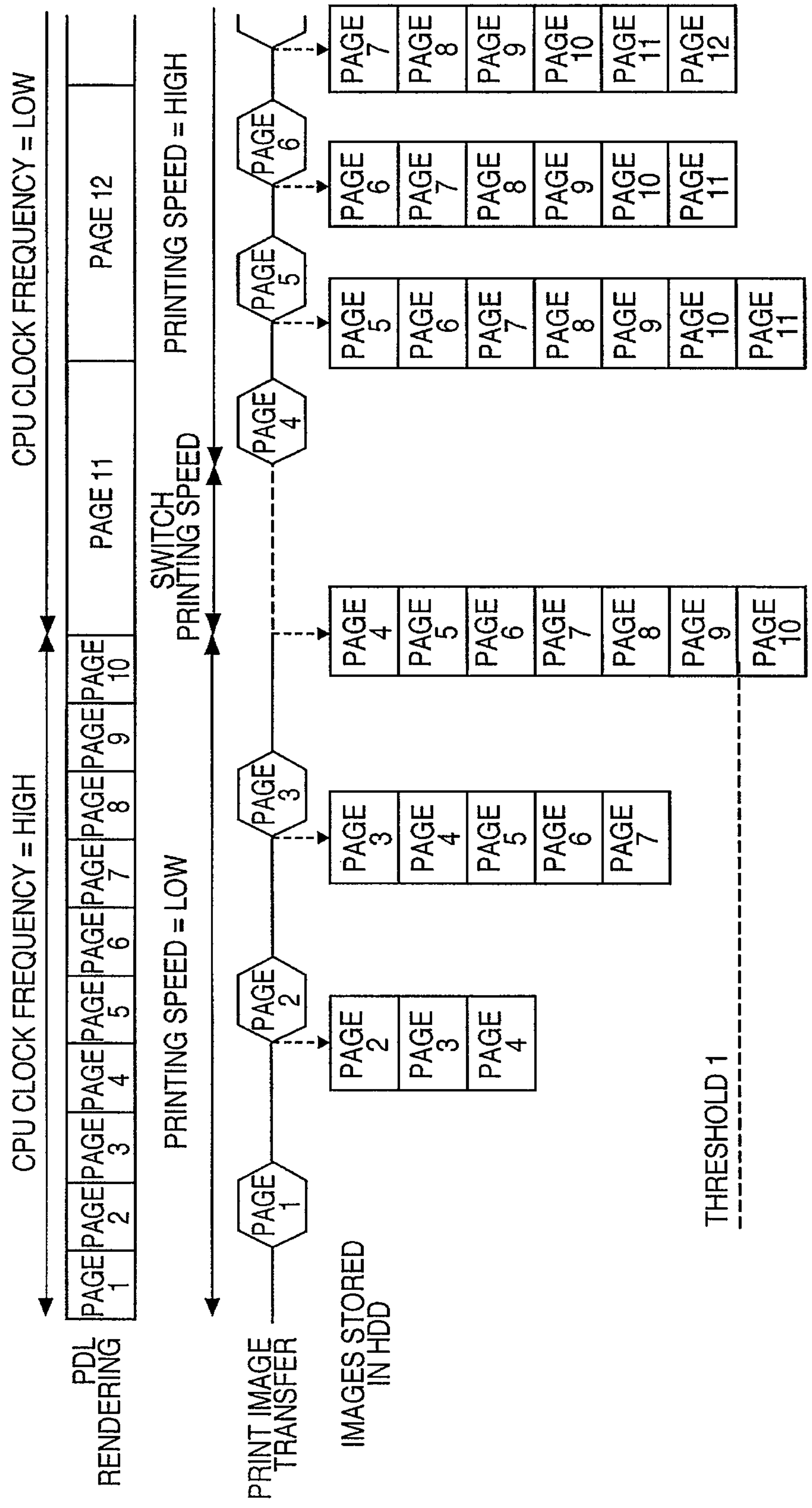
FIGS. 12A and 12B are schematic diagrams explaining a PDL data rendering process performed per page and a printing timing through raster image data transfer to the printing unit by the multifunction peripheral according to the present embodiment.
Figure 12B:
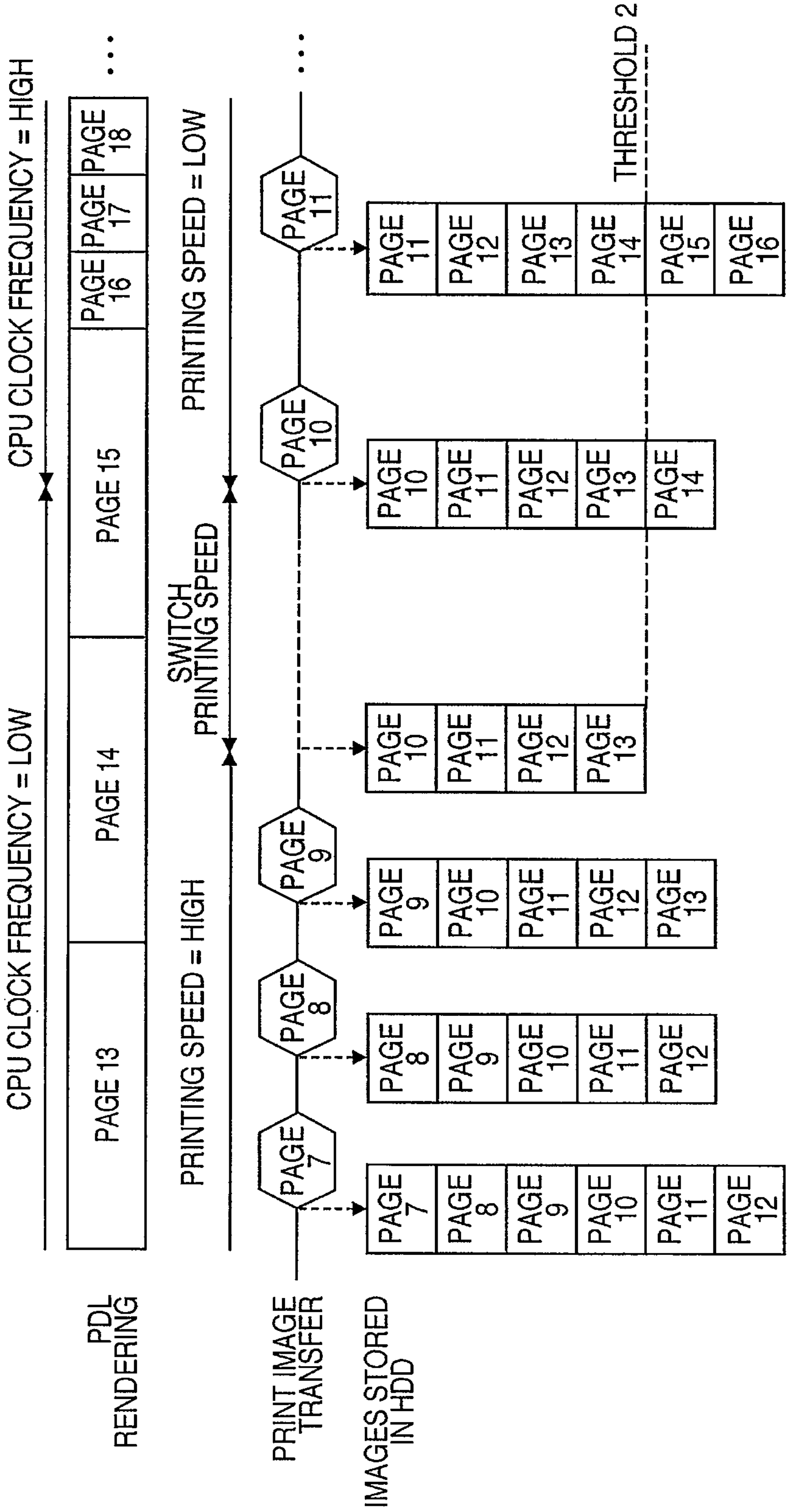

FIGS. 12A and 12B are schematic diagrams explaining a PDL data rendering process performed per page and a printing timing through a raster image data transfer to the printer unit 103. FIGS. 12A and 12B further show the number of pages of raster image data accumulated in the HDD 440.

In FIGS. 12A and 12B, the clock frequency of the CPU 110 is switched between two stages, wherein A1 represents the electric power consumption of the CPU 110 when the clock frequency of the CPU 110 is high and A2 represents the electric power consumption of the CPU 110 when the clock frequency of the CPU 110 is low (A1>A2). In addition, the printing speed (image forming speed) is also switched between two stages, wherein B1 represents the electric power consumption of the printer unit 103 when the printing speed is high and B2 represents the electric power consumption of the printer unit 103 when the printing speed is low (B1>B2). Furthermore, C represents electric power consumed by devices and parts other than the CPU 110 and the printer unit 103 across the entire multifunction peripheral, and M represents an upper-limit electric power consumption available to the entire multifunction peripheral. In this case, the clock frequency of the CPU 110 and the printing speed of the printer unit 103 are set in advance so that the following relational expressions are true.

$$A1+B1+C>M \quad (1)$$

$$A1+B2+C<M \quad (2)$$

$$A2+B1+C<M \quad (3)$$

From the above, it may be understood that the electric power consumption of the entire multifunction peripheral can be held under the maximum electric power consumption M by reducing either one of the clock frequency of the CPU 110 and the printing speed of the printer unit 103.

In FIG. 12A, upon commencement of a print job including PDL data, the PDL data rendering capability is increased by raising the clock frequency of the CPU 110. At this point, the printing speed of the printer unit 103 is set low under power saving control and electric power consumption is kept below the maximum electric power consumption M (the state represented by (2) above). From pages 1 to 3, transferring of image data to be printed is performed in a long time period while the PDL data rendering process is executed at high speed. As a result, at the timing where transferring of print image data of page 4 is commenced, the PDL data rendering process has already advanced to page 10. At this point, seven pages' (page 4 to page 10) worth of unprinted image data is accumulated in the HDD 440. In this case, the number of pages of unprinted image data becomes or greater than a threshold 1 (set to "6" for this example). Accordingly, the CPU 110 judges that the number of unprinted pages (unused for image forming) accumulated in the HDD 440 has exceeded the threshold 1 and switches the printing speed of the printer unit 103 to a faster speed. At the same time, the CPU 110 lowers the clock frequency of the CPU 110 and reduces electric power consumption of the CPU 110 to below the maximum electric power consumption M (the state represented by (3) above). Printing of page 4 is commenced after the printing speed of the printer unit 103 is switched to the faster speed. For page 4 and thereafter, the clock frequency of the CPU 110 is reduced while the printing speed of the printer unit 103 is increased to execute the PDL data rendering process and the printing operation in parallel.

FIG. 12B shows a continuation of FIG. 12A. In FIG. 12B, the printing speed of the printer unit 103 exceeds PDL data rendering capability. As a result, the number of pages of unprinted raster image data accumulated in the HDD 440 is smaller. At the timing of commencement of the printing of page 10, the number of pages of unprinted image data accumulated in the HDD 440 becomes or below a threshold 2 (set to "4" for this example). Consequently, the CPU 110 switches the printing speed of the printer unit 103 to low speed to perform power saving control of the printer unit 103. Therefore, image data of page 10 and thereafter will be printed at a slow printing speed. Meanwhile, when the printing speed of the printer unit 103 is switched to a low speed, the clock frequency of the CPU 110 is raised to increase PDL data rendering capability so that the subsequent PDL data rendering process is performed at high speed. The electric power consumption in this case assumes a state represented by (2) above. Due to the subsequent increase in PDL data rendering capability and the reduction in printing speed, if the number of pages of unprinted image data stored in the HDD 440 exceeds the threshold 1 (6), as shown in FIG. 12A described earlier, electric power saving control is executed by switching the printing speed of the printer unit 103 to a higher speed and reducing the clock frequency of the CPU 110.

As noted above in the description of the printing operations of the printer unit 103, the printer unit 103 maintains its printing speed by performing advance feeding in which several recording sheets are fed in advance. Conversely, there may be cases where the inability to perform advance feeding may prevent a predetermined printing speed from being achieved. Therefore, the threshold 2 in FIG. 12B is desirably greater than a sum of the single page to be printed and the number of advance-fed pages. As such, the threshold 2 is set to "4" for the present embodiment.

When the PDL data rendering speed is approximately a median of the high and low printing speeds of the printer unit 103, if only the threshold 2 is provided, frequent switching of the printing speeds of the printer unit 103 may occur. In this case, if the time period required by the printer unit 103 to switch printing speeds exceeds the time period of image data received by the printer unit 103 under electric power saving control, the printing speed may actually drop as a result of switching printing speeds. Therefore, it is desirable to provide the threshold 1 and set a value thereof to be equivalent to the number of pages such that it is faster to continue printing at a lowered printing speed of the printer unit 103 rather than switching the printing speeds of the printer unit 103 and to a value that is greater than the threshold 2. As such, the threshold 1 is set to "6" for the present embodiment. In the case where an extended time period is not required to switch printing speeds of the printer unit 103, the threshold 1 and the threshold 2 may take the same value.

Processing performed by the print control module 915 of the software shown in FIG. 9 and which runs on the CPU 110 to realize the operations shown in FIGS. 12A and 12B will now be described with reference to the flowcharts shown in FIGS. 13 to 16. The print control module 915 can be divided into a feed judgment control that is activated upon program activation and a page processing task activated for each page to be printed.

Figure 13:
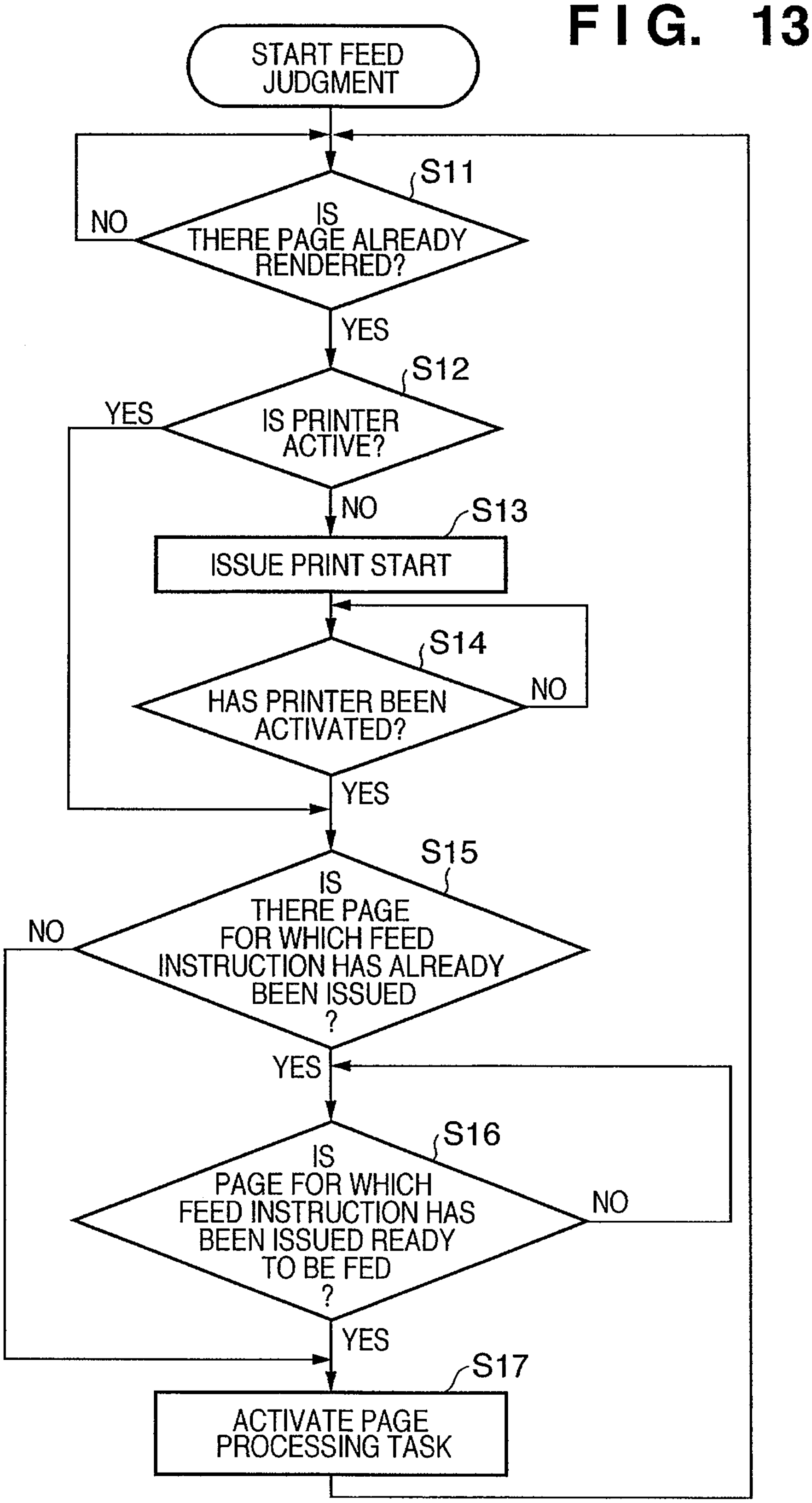
FIG. 13 is a flowchart explaining processing performed by a print control module of the multifunction peripheral according to the present embodiment.

FIG. 13 is a flowchart explaining processing performed by the print control module 915 of the multifunction peripheral according to the present embodiment. A program executing the processing is stored in the memory 105 during execution thereof and is executed under the control of the CPU 110.

The processing is executed in a feed judgment process that is commenced upon program activation. First, in step S11, the print control module 915 waits for printable raster image data to be generated. Creation of raster image data is notified to the print control module 915 from the synchronous control module 913. Upon notification of the generation of raster image data, the processing advances to step S12 where the print control module 915 determines whether or not the printer unit 103 has been activated. At this point, if the printer unit 103 has been activated, the processing advances to step S15, but if not, the processing advances to step S13 to activate the printer unit 103 and proceeds to step S14. When activated, the printer unit 103 performs a predetermined initializing process and subsequently notifies an activation completion to the print control module 915. Accordingly, the print control module 915 confirms activation of the printer unit 103 in step S14 and proceeds to step S15.

In step S15, in order to print raster image data, it is determined whether or not a feed instruction for a recording sheet on which the image data is to be printed has already been issued. At this point, if the recording sheet feed instruction has already been issued, the processing advances to step S16 to wait for feeding commencement of the recording sheet for which a feed instruction has already been issued to become executable. On the other hand, if the recording sheet feed instruction has not been made in step S15 or if feeding commencement of a recording sheet for which a feed instruction has already been made becomes executable in step S16, the processing advances to step S17 to activate a page processing task. The processing subsequently returns to step S11 to execute processing for the next page.

Figure 14:
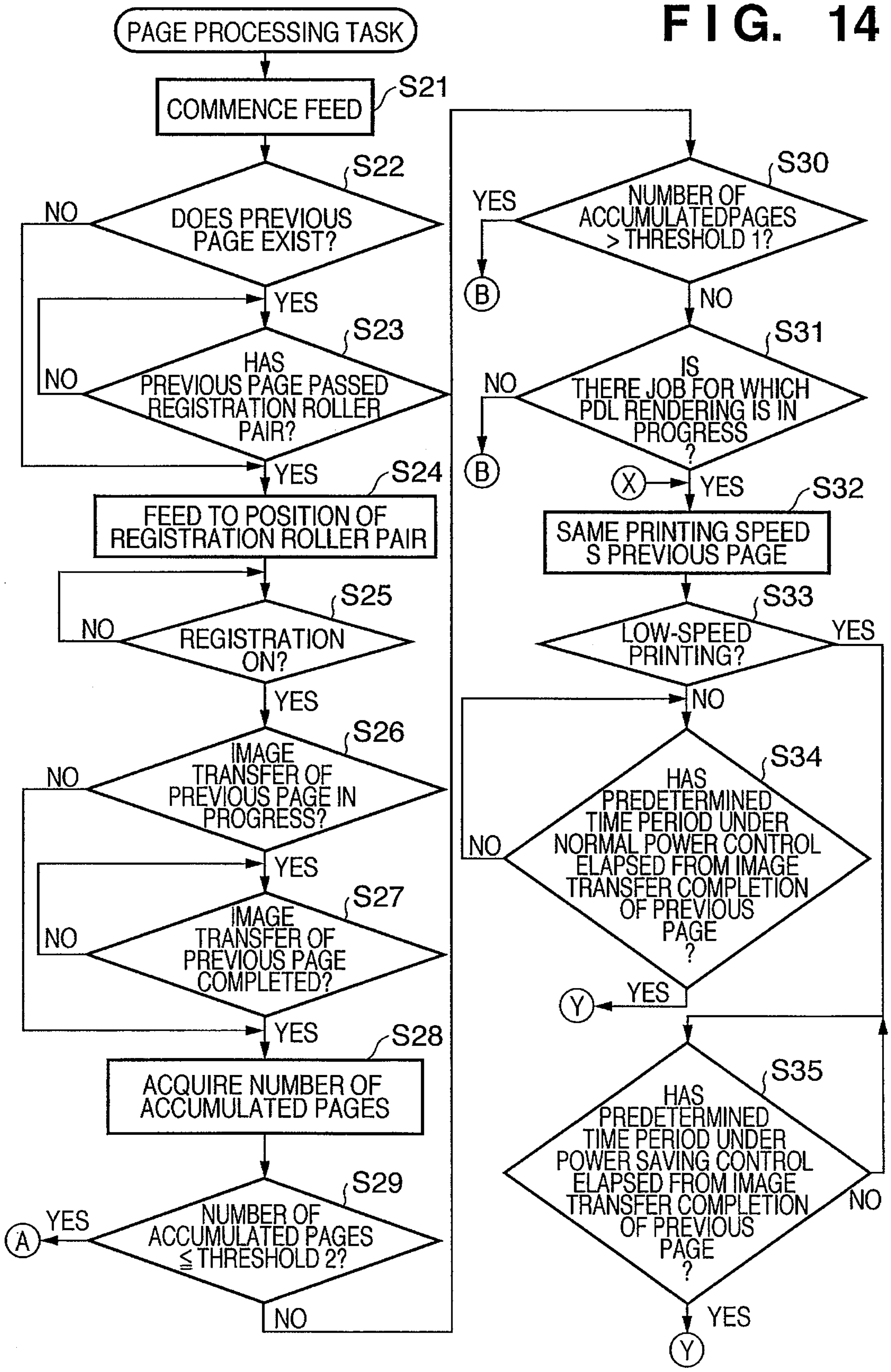
FIGS. 14, 15 and 16 are flowcharts explaining processing performed by the print control module of the multifunction peripheral according to the present embodiment.
Figure 15:
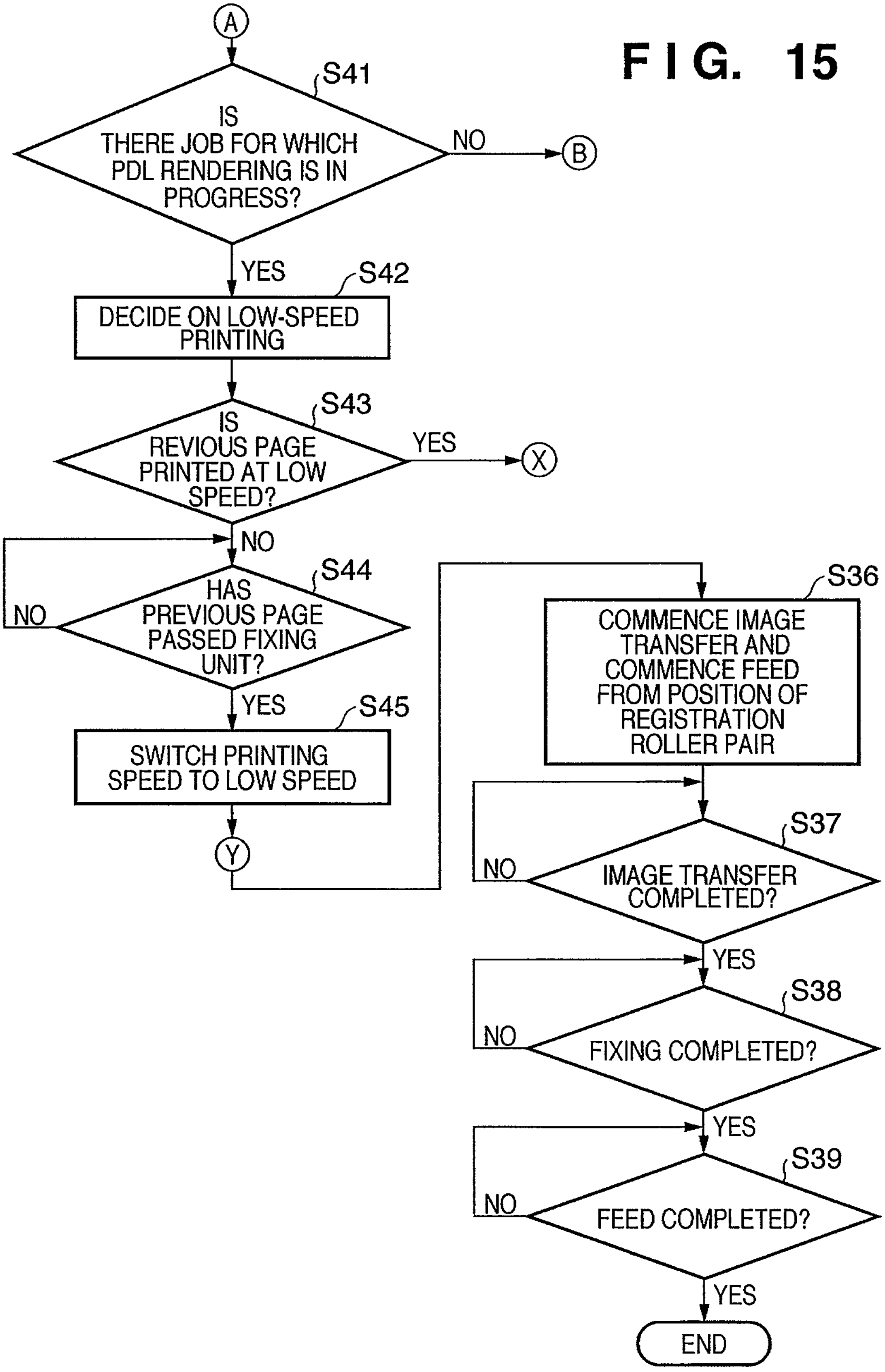
Figure 16:
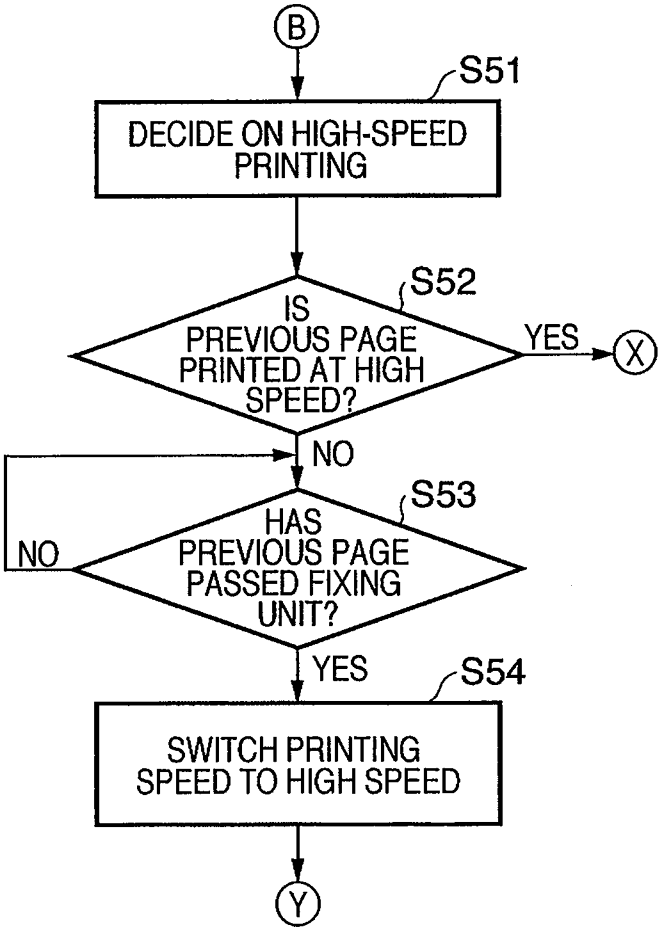

FIGS. 14, 15 and 16 are flowcharts explaining processing of a page processing task performed by the print control module 915 of the multifunction peripheral according to the present embodiment. The print control module 915 activates a page processing task for each page of raster image data. A page processing task performs processing from feeding up to paper discharge completion of a recording sheet on which the page is to be printed. A program executing the processing is stored in the memory 105 during execution thereof and is executed under the control of the CPU 110.

The processing shown in FIG. 14 is commenced upon activation of a page processing task. First, in step S21, a feed commencement process is performed to feed a recording sheet from the cassette 318 or the feed deck 314 and convey the recording sheet to the feeding path 319. In step S22, it is determined whether or not previous-page raster image data exists on which a print operation is currently being performed. If data of a previous page exists, the processing advances to step S23 to wait for the recording sheet on which the previous page is to be printed to pas through the position of the registration roller pair 344. On the other hand, if data of the previous page does not exist in step S22 or if the recording sheet on which the previous page is to be printed passes the position of the registration roller pair 344 in step S23, the processing advances to step S24 to convey the recording sheet on which printing is to be performed next to the position of the registration roller pair 344. The processing then advances to step S25 to wait for the recording sheet to arrive at the position of the registration roller pair 344 (registration ON). Upon arrival of the recording sheet at the position of the registration roller pair 344, the processing advances to step S26 to determine whether or not image data of the previous page is currently being transferred. If so, the processing proceeds to step S27 to wait for transfer completion of the image data of the previous page. If there are no pages whose image data are being transferred in step S26 or upon completion of transfer of the image data of the previous page in step S27, the processing advances to step S28 to transfer the image data of the page on which a page processing task is currently in progress. The page processing task subsequently acquires the number of pages of raster image data accumulated in the HDD 440 which is notified by the print control module 915.

A supplementing description on the number of accumulated pages will now be given with reference to FIGS. 17A-17C.

Figures 17A, 17B, 17C:
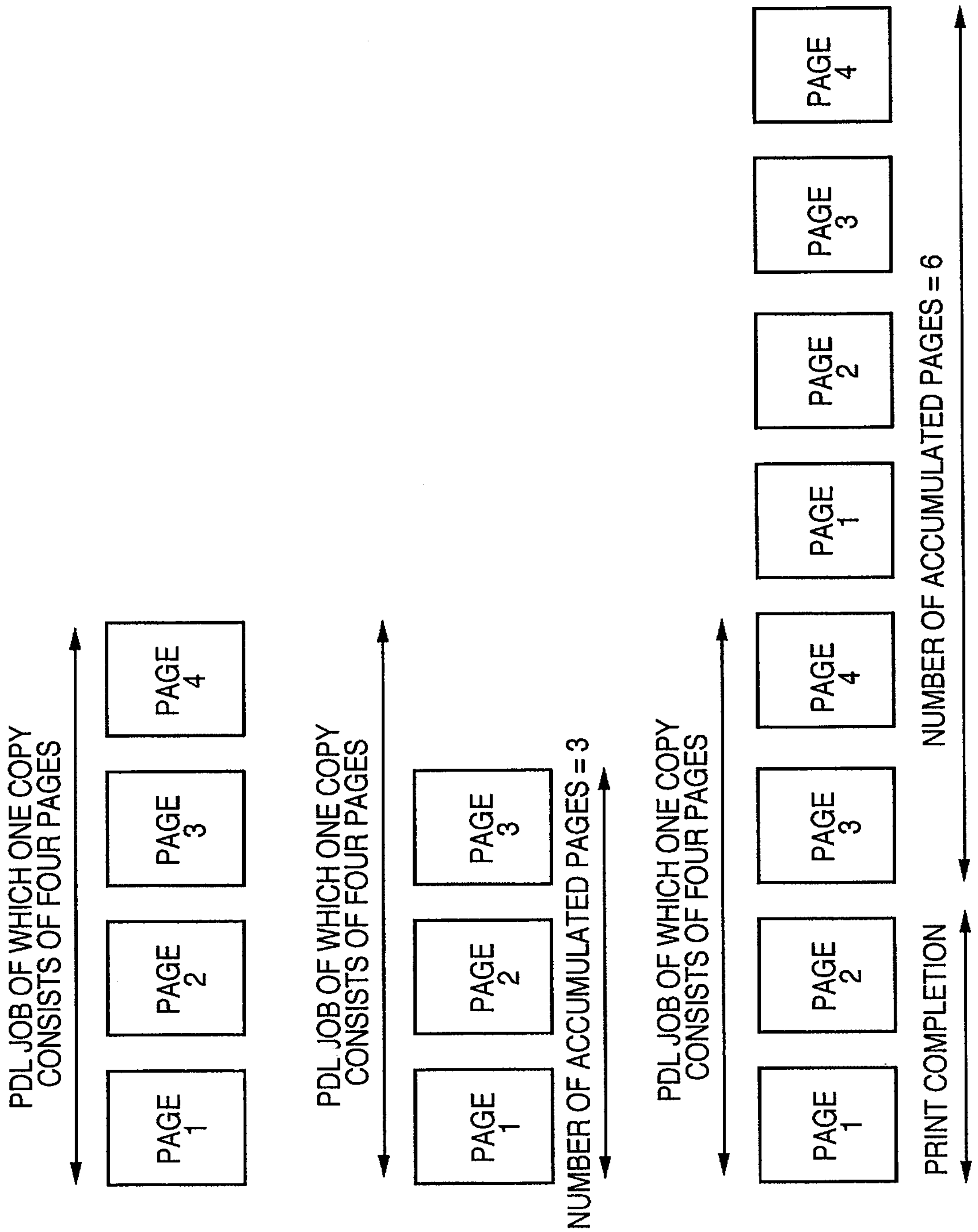
FIGS. 17A to 17C are diagrams explaining a method for obtaining the number of accumulated pages according to the present embodiment.

FIG. 17A shows PDL data of which a single copy includes four pages. Now, a case will be considered where two copies of the PDL data is printed.

FIG. 17B represents a time point at which rendering of PDL data up to the third page has been completed. At this point, the number of accumulated pages is "3". After the PDL data rendering process proceeds and upon completion of rendering of PDL data of the fourth page, the number of pages of the second copy is added. In other words, in the case where no pages have been printed at a time point where two copies' worth of PDL data has been stored, the number of accumulated pages is "8" (=2×4).

FIG. 17C represents a case where, at the time point at which rendering of the PDL data of the fourth page is completed, printing of image data of 2 pages (page 1 and page 2) has already been completed. In this case, the number of accumulated pages is "6" (=8−2). As seen, when printing a plurality of copies, the number of accumulated pages is calculated by adding a product of the number of pages included in a single copy and the remaining number of copies to the number of accumulated pages at that time point upon completion of rendering of the first copy of PDL data (in this case, four pages).

After calculating the number of accumulated pages in this manner, the processing advances to step S29 to determine whether or not the calculated number of accumulated pages is equal to or smaller than the threshold 2 (in the present embodiment, "4"). At this point, if the number of accumulated pages is equal to or smaller than the threshold 2, the processing proceeds to step S41 in FIG. 15. The flowchart shown in FIG. 15 will be described later.

In step S29, if it is determined that the number of accumulated pages is greater than the threshold 2, the processing advances to step S30 to determine whether or not the number of accumulated pages is greater than the threshold 1 (in this case, "6"). At this point, if the number of accumulated pages is greater than the threshold 1, the processing advances to step S51 in FIG. 16. The flowchart shown in FIG. 16 will be described later.

In step S30, if the number of accumulated pages is smaller than the threshold 1, the processing advances to step S31 to inquire of the job control module 908 on whether a job exists for which a PDL data rendering process is currently being executed. At this point, if there are no jobs for which a PDL data rendering process is being executed, the processing proceeds to step S51 in FIG. 16 to perform high-speed printing. The judgment of whether a job exists for which a PDL data rendering process is being executed is made in step S31 because of the following reason. That is, even in a case where the printing speed of the printer unit 103 is reduced (the printer unit is under power saving control) during printing of the previous page, there is no need to supply much more electric power to the CPU 110 if a PDL data rendering process is not being executed. Therefore, electric power originally intended for the CPU 110 is made available to the printer unit 103 in order to quickly print the remaining pages at maximum printing speed (the printer unit is under normal power control).

If a job for which PDL data is being rendered exists in step S31, the processing advances to step S32. In this case, since image data of the number of pages between the threshold 1 and the threshold 2 are accumulated in the HDD 440, it is judged that print control be performed at the same printing speed as the previous page. The processing then advances to step S33, it is determined whether or not the current printing speed is the low speed, in other words, low-speed printing (the printer unit is under power saving control and the CPU is running at normal power (the clock frequency of the CPU is high)). If not (if high-speed printing is performed (the printer unit is under normal power control and the CPU is running under power saving)), the processing proceeds to step S34. In step S34, the processing waits for the transfer time period of image data under high-speed printing to elapse from transfer completion of the image data of the previous page.

On the other hand, if it is determined in step S33 that low-speed printing is being performed (the printer unit is under power saving control), the processing advances to step S35 to wait for the transfer time period of image data under low-speed printing to elapse. After a predetermined time period elapses in step S34 or step S35, the processing advances to step S36 (FIG. 15) and commences conveying of a recoding sheet from the position of the registration roller pair 344 in synchronization with the transfer commencement of image data of the page currently being processed. In step S37, the processing waits for transfer completion of the image data, and in step S38, waits for fixing completion of the transferred recording sheet by the fixing unit 322. Upon completion of fixing, the processing proceeds to step S39 to wait for discharging of the recording sheet to be completed. The page processing task is completed upon completion of discharging of a recorded sheet in this manner.

Processing of a page processing task subsequent to reference character A in FIG. 14 will now be described with reference to the flowchart shown in FIG. 15. The flowchart shown in FIG. 15 describes processing where, for example, in FIG. 12B, the printing speed of the printer unit 103 is switched to low speed (low-speed printing) in a case that the number of pages of raster image data stored in the HDD 440 drops to or below the threshold 2 (4).

In step S41, the processing acquires whether there is a job for which a PDL data rendering process is being performed from the job control module 908, and determines whether or not a job for which a PDL data rendering process is being performed exists. If there are no jobs for which PDL data is being rendered, since there is no need to increase the processing capability of the CPU 110 even if the number of accumulated pages is smaller than the threshold 2, the processing advances to step S51 (high-speed printing) in FIG. 16. In step S41, if it is determined that there is a job for which a PDL data rendering process is being performed, the processing advances to step S42 and decides that the printing speed of the printer unit 103 should be lowered. The processing advances to step S43 to determine whether or not the previous page is being printed at a lowered printing speed. At this point, if the previous page is also being printed at low speed (the printer unit is under power saving control), the processing advances to step S32 in FIG. 14 to execute printing at the same printing speed as the previous page.

On the other hand, in step S43, if the printer unit 103 is under normal power control (high-speed printing) during the printing of the previous page, because the printing speed must be lowered, the processing advances to step S44 to wait for the recording sheet on which the previous page has been printed to pass through the fixing unit 322. Once the recording sheet on which the previous page has been printed passes through the fixing unit 322, the processing advances to step S45 to switch to low-speed printing (the printer unit is under power saving control) where the printing speed is lowered. At the same time, the clock frequency of the CPU 110 is switched to a high frequency. The processing advances to step S36 to execute processes from transfer commencement of image data to discharge completion of the recording sheet.

Next, processing subsequent to reference character B in FIG. 14 will now be described with reference to the flowchart in FIG. 16. The flowchart shown in FIG. 16 illustrates processing where, for example, in FIG. 12A, the printing speed of the printer unit 103 is switched to high speed (high-speed printing) in a case that the number of pages of raster image data stored in the HDD 440 rises to or above the threshold 1 (6).

In step S51, it is determined that printing be performed at the normal printing speed (high-speed printing) that is the printing speed when the printer unit 103 is under normal power control. The processing advances to step S52 to determine whether or not the previous page is being printed at high-speed printing. If so, since there is no need to change printing speeds, the processing advances to the aforementioned step S32 in FIG. 14.

On the other hand, in step S52, if it is determined that the previous page is not printed by high-speed printing (the printer unit 103 is under normal power control), since printing speeds must be switched, the processing advances to step S53 to wait for the recording sheet on which the previous page has been printed to pass through the fixing unit 322. Once the recording sheet on which the previous page has been printed passes through the fixing unit 322, the processing advances to step S54 to switch the printing speed to high-speed printing, i.e., to normal power control. At the same time, the clock frequency of the CPU 110 is lowered. The processing next advances to step S36 in FIG. 15 to execute the processing described above.

Since the conveying speed of recording sheets can be reduced by switching the printing speed of the printer unit 103 from normal speed (high speed) to low speed, the electric power consumed by a motor and the like can be reduced by just that amount. However, in order to achieve a higher electric power saving effect, energization control of the fixing unit 322 is desirably performed in accordance with printing speed. Since the number of recording sheets passing the fixing unit 322 in a unit time period increases during high-speed printing, the heaters 711, 712 and 713 must be simultaneously energized at all times to prevent the temperature of the fixing roller 706 from decreasing. In contrast, with low-speed printing, since the number of recording sheets passing the fixing unit 322 in a unit time period is reduced, temperature depression of the fixing roller 706 is suppressed, thereby creating time period that allows at least one of the heaters 711, 712 and 713 to be turned off. By reducing the electric power supplied to the fixing unit 322 during low-speed printing, the electric power saving effect achieved by low-speed printing of the printer unit 103 can be further enhanced. With the present embodiment, while total electric power consumption is changed by controlling electric power consumption of the fixing unit, the present invention is not limited to this arrangement. Alternatively, total electric power consumption may be changed by controlling the electric power supplied to a charged member (charger) or a developing member (developer).

As described above, according to the first embodiment, by switching printing speeds and the clock frequency of the CPU in accordance with the number of pages of printable print data already rendered, an effect can be achieved where the electric power consumption of the entire device is suppressed to or below a predetermined value while preventing a reduction in printing efficiency.

In addition, according to the present embodiment, when increasing the clock frequency of the CPU to enhance PDL data rendering capability results in an increase in electric power consumption of the CPU, the printing speed of the printer is lowered so that the electric power consumption of the MFP can be reduced. Conversely, when increasing the printing speed of the printer results in an increase in the electric power consumption, the clock frequency of the CPU is lowered. It is thereby possible to hold the maximum electric power consumption of the entire MFP to or below a predetermined value.

Efficient electric power distribution to the CPU and the printer unit can be achieved by varying the processing capability of the CPU in accordance with the number of pages of rendered print data. Moreover, even if processing PDL data whose rendering process presents a heavy load, the maximum electric power consumption of the entire MFP may be held to or below a predetermined value while suppressing a reduction in overall printing speed.

Second Embodiment

With the first embodiment described above, the number of accumulated pages is calculated solely from the number of pages of print data stored in a memory (HDD). However, for example, the time period required to print image data whose paper size is 11 by 17 inches (17 inches in the paper conveying direction) is approximately double the time period required to print on a letter-size paper (8.5 inches in the paper conveying direction). Therefore, with a large-sized recording sheet, since the rate at which the number of pages already printed is counted up is slow, there may be cases where the clock frequency of the CPU need not be increased in order to increase the PDL data rendering capability.

Consequently, for the calculation of the number of accumulated pages, when printing image data on a page corresponding to a paper size of 8.5 inches or less, +1 is counted per page. On the other hand, when the paper size exceeds 8.5 inches, each page of image data is counted as +2 to be added to the number of accumulated pages. This enables the number of accumulated pages to be calculated based on the printing speed of the recording sheet to be actually printed and on the amount of rendered image data. As a result, a CPU execution speed and printing speed control better suited to an actual printing speed can be realized.

Third Embodiment

In the case where a print job using a next piece of PDL data is input during a printing operation of the printer unit 103, if the rendering of the PDL data currently under a printing operation has already been completed, a PDL data rendering process for the next print job is executed. At this point, since printing of the next print job has not yet commenced, the clock frequency of the CPU 110 may be lowered to perform a PDL data rendering process at low speed. In this case, the printer unit 103 is subjected to normal power control to perform printing at high speed. Conversely, if the rendering of the PDL data currently under a printing operation has not been completed, the clock frequency of the CPU 110 is increased to enhance PDL data rendering capability in order to complete the PDL data rendering earlier, and low-speed printing (the printer unit is under power saving control) is performed by the printer unit 103. When control such as described above is performed, the processing of the page processing task performed by the print control module 915 differs from that of the first embodiment described above.

Figure 18:
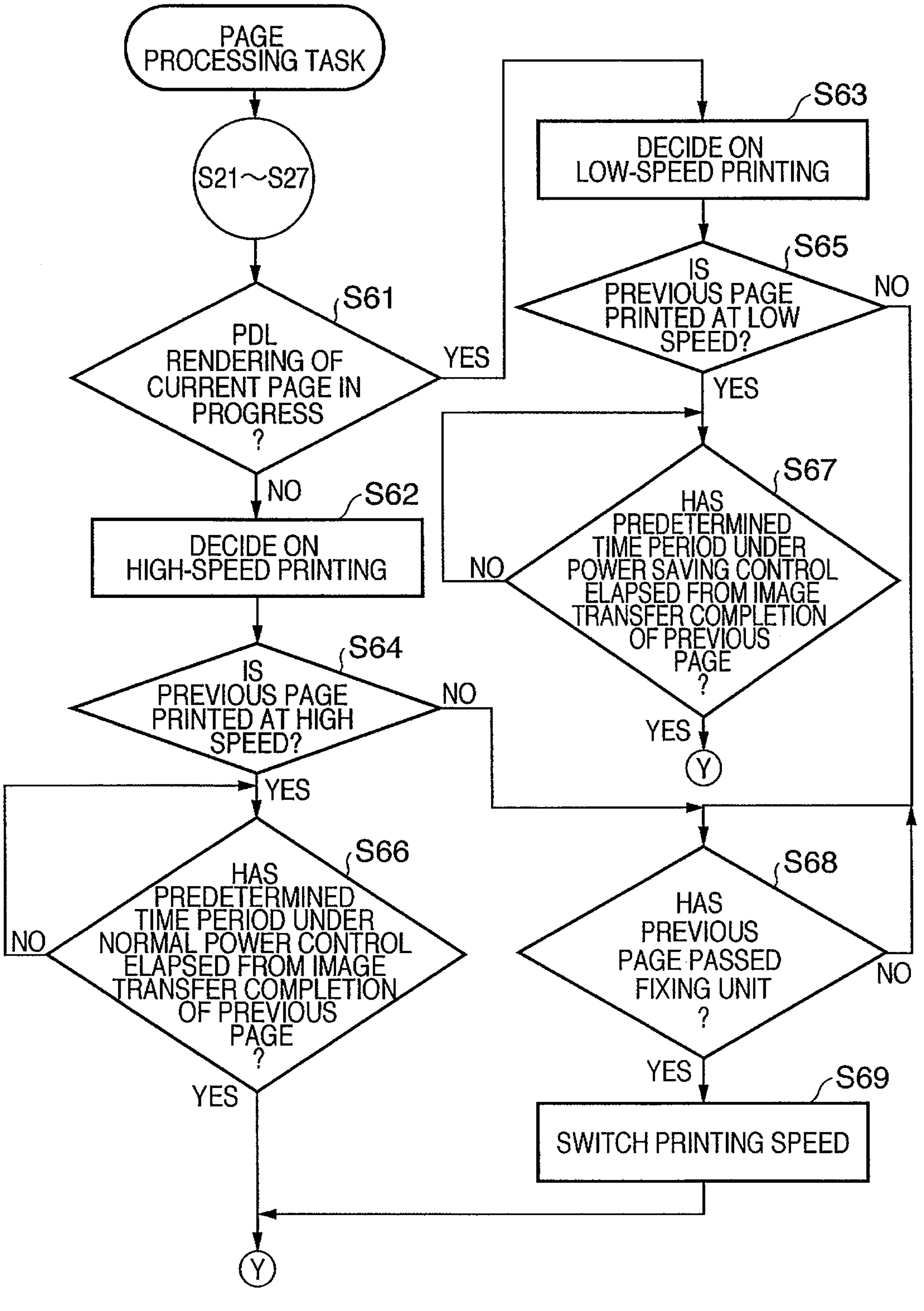
FIG. 18 is a flowchart explaining processing of a page processing task of a multifunction peripheral according to a third embodiment of the present invention.

FIG. 18 is a flowchart explaining processing of a page processing task of a multifunction peripheral according to a third embodiment. The hardware configuration of the multifunction peripheral according to the third embodiment is the same as that of the first embodiment described above. A program executing the processing is stored in the memory 105 during execution thereof and is executed under the control of the CPU 110. In FIG. 18, steps (steps S21 to S27 in FIG. 14 and steps S36 to S39 in FIG. 16) common to the steps in FIG. 14 described earlier are assigned like reference characters and a description thereof is omitted.

In step S61, based on data from the job control module 908, it is determined whether or not the PDL data of a PDL print job of a page for which image data transfer is to be commenced is currently being rendered. At this point, if PDL data rendering has been completed, the processing advances to step S62 to decide that high-speed printing (the printer unit 103 is under normal power and the CPU is subjected to power saving) be performed. On the other hand, if PDL data rendering has not been completed, the processing advances to step S63 to decide that low-speed printing (the printer unit 103 is subjected to power saving and the CPU is under normal power) be performed. After executing step S62 or step S63, the processing respectively advances to step S64 or step S65. In step S64 or S65, it is determined whether or not the printing speed at which the previous page was printed requires to be changed in order to print the current page. That is, it is determined in step S63 whether or not the previous page is printed at a high speed, and it is determined in step S64 whether or not the previous page is printed at a low speed. If it is determined "NO" in step S64 or S65, i.e., that the printing speed must be changed, the processing advances to step S68 to wait for the printed recording sheet on which the previous page was printed to pass through the fixing unit 322. Once the recording sheet on which the previous page has been printed passes through the fixing unit 322, the processing advances to step S69 to switch the printing speed of the printer unit 103 to the printing speed set in step S62 or S63. On the other hand, if it is determined in step S64 or S65 that the printing speed is the same as for the previous page, the processing respectively advances to step S66 or S67 to wait for the transfer time period of image data under the respective printing speeds to elapse. Once the transfer time period elapses, the processing advances to step S36 (FIG. 15) to commence image data transfer. Since the processing of step S36 and thereafter is the same as the processing shown in FIG. 15 described above, a description thereof will be omitted.

As described, according to the third embodiment, if the rendering process of the PDL data of the page to be printed next is not in progress, the printing speed of the printer unit 103 is switched to high-speed (normal power control), and if the rendering process of the PDL data of the page to be printed next is in progress, the clock frequency of the CPU is increased to increase CPU processing speed. Consequently, reductions in the processing efficiency of the entire MFP can be prevented and electric power consumption can be held under a certain level.

The values of the aforementioned thresholds 1 and 2 are merely exemplary and the present invention is not limited to these values.

In addition, for simplicity, the embodiments presented above have been described using a case where the clock frequency of the CPU and the printing speed are respectively switchable between two stages and control is performed so that, when one of the clock frequency and the printing speed is switched to a high setting, the other is switched to a low setting. However, the clock frequency of the CPU and the printing speed can be arranged to be switchable among multiple stages. Furthermore, electric power consumption selection may be arranged to be controlled among a larger number of options in accordance to such switching.

Other Embodiments

The present invention may either be applied to a system comprising a plurality of devices, or an apparatus constituted by a single device.

The present invention may also be accomplished by directly or remotely supplying a software program which realizes the respective functions of the above-described embodiments to a system or an apparatus, and causing a computer of the system or the apparatus to read out and execute the supplied program. In such a case, a program configuration need not be required as long as functions of the program are provided.

Therefore, the program codes themselves, to be installed to the computer in order to achieve the functions and processing of the present invention through the computer, may also achieve the present invention. In other words, the claims of the present invention also encompass the computer program themselves for achieving the functions and processing of the present invention. In such a case, as long as program functions are retained, the program may take any form, including an object code, an interpreter-executable program, or script data supplied to an OS.

Recording media of various types may be used for supplying the program. Such recording media may include, for instance, a floppy (registered trademark) disk, a hard disk, an optical disk, a magneto-optical disk, an MO, a CD-ROM, a CD-R, a CD-RW, a magnetic tape, a nonvolatile memory card, a ROM, a DVD (DVD-ROM, DVD-R), or the like.

Other methods of supplying the program include accessing an Internet home page using a browser of a client computer and downloading the program from the home page to a recording medium such as a hard disk. In such a case, either the computer program itself of the present invention or a compressed file having an auto-install function may be downloaded. In addition, the present invention may also be achieved by dividing the program codes which constitute the program of the present invention into a plurality of files, and respectively downloading each file from a different home page. In other words, the claims of the present invention also encompass a WWW server that allows downloading of program files for achieving the functions and processing of the present invention on a computer by a plurality of users.

Furthermore, the program according to the present invention may be encoded and stored in a storage medium such as a CD-ROM to be distributed to users. In such a case, users who satisfy certain conditions may be allowed to download key information for decoding from a home page via the Internet, whereby the key information may be used to install the program on a computer in an executable format.

Moreover, the present invention may be achieved not necessarily by causing a computer to read and execute the program to realize functions of the above-described embodiments. For example, the functions of the above-described embodiments may also be achieved by processing by causing an OS or the like running on the computer to perform a portion of or all of the actual processing based on instructions in the program.

In addition, a program that is read out from a recording medium may be written into a memory provided on a function extension board inserted into a computer or a function extension unit connected to the computer. In such a case, the functions of the above-described embodiments may also be achieved by processing performed by a CPU or the like provided on the function extension board or the function extension unit which performs a portion of or all of the actual processing based on instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-82747, filed Mar. 27, 2007, which is hereby incorporated by reference herein in its entirety.

What is claimed is:

1. An image forming apparatus comprising:

an input unit configured to input image data;

a rendering unit configured to perform rendering on the image data input by the input unit;

an image forming unit configured to perform image forming based on image data on which the rendering is performed by the rendering unit; and a control unit configured to, when the input unit inputs image data of a second job while the image forming unit is performing image forming based on image data of a first job preceding to the second job, (i) control the rendering unit to perform rendering on the image data of the second job in low-speed different from zero and control the image forming unit to perform image forming based on the image data of the first job in high-speed, in a case that the rendering unit has completed rendering on the image data of the first job, and (ii) control the rendering unit to perform rendering on the image data of the first job in high-speed and control the image forming unit to perform image forming based on the image data of the first job in low-speed different from zero, in case that the rendering unit has not completed rendering on the image data of the first job.

2. An apparatus according to claim 1, wherein the control unit controls the processing speed of the rendering unit by changing a frequency of a clock of a CPU included in the rendering unit.

3. An apparatus according to claim 1, further comprising:

a power consumption change unit configured to change electric power consumption of the image forming unit in accordance with a change in the image forming speed of the image forming unit.

4. An apparatus according to claim 3, wherein the power consumption change unit changes the electric power consumption of the image forming unit by changing electric power supplied to a fixing unit included in the image forming unit.

5. An apparatus according to claim 1, wherein the control unit further performs control so that electric power consumption of the entire image forming apparatus does not exceed a predetermined value.

6. A control method of an image forming apparatus for rendering input print data to perform image forming, the method comprising:

an input step of inputting image data;

a rendering step of performing rendering on the image data input in the inputting step;

an image forming step of performing image forming an image based on image data on which the rendering is performed in the rendering step; and a control step of, when the input step inputs image data of a second job while the image forming step is performing image forming based on image data of a first job preceding to the second job, (i) controlling the rendering step to perform rendering on the image data of the second job in low-speed different from zero and controlling the image forming step to perform image forming based on the image data of the first job in high-speed, in case that the rendering step has completed rendering on the image data of the first job, and (ii) controlling the rendering step to perform rendering on the image data of the first job in high-speed and controlling the image forming step to perform image forming based on the image data of the first job in low-speed different from zero, in case that the rendering step has not completed rendering on the image data of the first job.

7. A control method according to claim 6, wherein the control step controls the processing speed in the rendering step by changing a frequency of a clock of a CPU for implementing the rendering step.

8. A control method according to claim 6, further comprising:

a power consumption change step of changing the electric power consumption in the image forming step in accordance with a change in the image forming speed.

9. A control method according to claim 8, wherein the power consumption change step changes the electric power consumption in the image forming step by changing electric power supplied to a fixing unit.

10. A control method according to claim 6, wherein the control step further performs control so that electric power consumption of the entire image forming apparatus does not exceed a predetermined value.

* * * * *